(12) United States Patent
Elshafie et al.

(10) Patent No.: US 11,991,715 B2
(45) Date of Patent: May 21, 2024

(54) TECHNIQUES TO SUPPORT USER EQUIPMENT BASED RELAYING FOR COVERAGE ENHANCEMENT

(71) Applicant: QUALCOMM Incorporated, San Diego, CA (US)

(72) Inventors: Ahmed Elshafie, San Diego, CA (US); Yi Huang, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 199 days.

(21) Appl. No.: 17/480,068

(22) Filed: Sep. 20, 2021

(65) Prior Publication Data

US 2022/0095362 A1 Mar. 24, 2022

Related U.S. Application Data

(60) Provisional application No. 63/081,450, filed on Sep. 22, 2020.

(51) Int. Cl.
*H04W 4/00* (2018.01)
*H04L 1/08* (2006.01)
*H04W 72/23* (2023.01)

(52) U.S. Cl.
CPC .............. *H04W 72/23* (2023.01); *H04L 1/08* (2013.01)

(58) Field of Classification Search
CPC ........ H04W 72/23; H04W 88/04; H04L 1/08; H04L 1/1887; H04L 1/1854; H04L 2001/0097

(Continued)

(56) References Cited

U.S. PATENT DOCUMENTS 11,582,665 B2 * 2/2023 Sartori .............. H04W 36/0055
2014/0133387 A1 * 5/2014 Wagner .................... H04B 7/15
370/315

(Continued)

OTHER PUBLICATIONS

Huawei., et al., "WF on Relay UE Assisted Resource Allocation", 3GPP TSG RAN WG1 Meeting #90, 3GPP Draft, R1-1714871, Way Forward on Relay UE Assisted Resource Allocation, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 21, 2017-Aug. 25, 2017, Aug. 26, 2017 (Aug. 26, 2017), 3 Pages, XP051328399, Retrieved from the Internet: URL: http://www.3gpp.org/ftp/tsg_ran/WG1_RL1/TSGR1_90/Docs/ [retrieved on Aug. 26, 2017], Background.

(Continued)

*Primary Examiner* — Chuong T Ho
(74) *Attorney, Agent, or Firm* — Holland & Hart LLP

(57) ABSTRACT

Methods, systems, and devices for wireless communications are described. The base station may transmit one or more transmissions to a first user equipment (UE) and a second UE, and the one or more transmissions may include a first grant for the first UE and a second grant for the second UE. The first grant may assign a first uplink resource for a source data transmission and a first downlink resource for feedback by the base station associated with the source data transmission. The second grant may assign a second uplink resource for a relay data transmission and a second downlink resource for feedback by the base station associated with the relay data transmission. The first UE and the relay UE may communicate with the other of the first UE and the second UE or the base station, or both, based on the first and second grant.

28 Claims, 15 Drawing Sheets

(58) Field of Classification Search
USPC .................................................. 370/329, 330
See application file for complete search history.

(56) References Cited

U.S. PATENT DOCUMENTS

| | | | |
|---|---|---|---|
| 2014/0369292 A1* | 12/2014 | Wu ....................... | H04W 76/15 370/329 |
| 2016/0338094 A1* | 11/2016 | Faurie .................. | H04W 88/04 |
| 2016/0338095 A1* | 11/2016 | Faurie ............... | H04W 28/0278 |
| 2017/0064729 A1* | 3/2017 | Sadek .................. | H04L 5/0053 |
| 2017/0374669 A1* | 12/2017 | Kahtava ............... | H04W 40/22 |
| 2018/0317210 A1* | 11/2018 | Zhang ............... | H04W 52/0216 |
| 2019/0045574 A1* | 2/2019 | Feng ................... | H04W 76/12 |
| 2019/0215854 A1* | 7/2019 | Wang ................. | H04B 7/15528 |
| 2019/0254059 A1* | 8/2019 | Gulati ................. | H04W 72/542 |
| 2019/0320361 A1* | 10/2019 | Uchiyama ............. | H04W 88/04 |
| 2020/0084811 A1* | 3/2020 | Uchiyama ............. | H04W 72/53 |
| 2020/0146032 A1 | 5/2020 | Bae et al. | |
| 2021/0120578 A1* | 4/2021 | Katranaras ............ | H04L 1/0061 |
| 2022/0338288 A1* | 10/2022 | Wang ................... | H04W 28/06 |

OTHER PUBLICATIONS

Intel Corporation: "Evaluation of Sidelink Communication Enhancements for IoT-centric Scenario", 3GPP TSG RAN WG1 Meeting #89, 3GPP Draft, R1-1707328 Intel-FED2D SIM-SC2, 3rd Generation Partnership Project (3GPP), Mobile Competence Centre, 650, Route Des Lucioles, F-06921 Sophia-Antipolis Cedex, France, vol. RAN WG1, No. Hangzhou, May 15, 2017-May 19, 2017 May 7, 2017 (May 7, 2017), pp. 1-6, XP051262988, Retrieved from the Internet: URL: http://www.3gpp.org/ftp/tsg_ran/WG1_RL1/TSGR1_89/Docs/ [retrieved on May 7, 2017], 4 Resource Allocation Techniques.

International Search Report and Written Opinion—PCT/US2021/051229—ISA/EPO—dated Jan. 7, 2022 (208021WO).

* cited by examiner

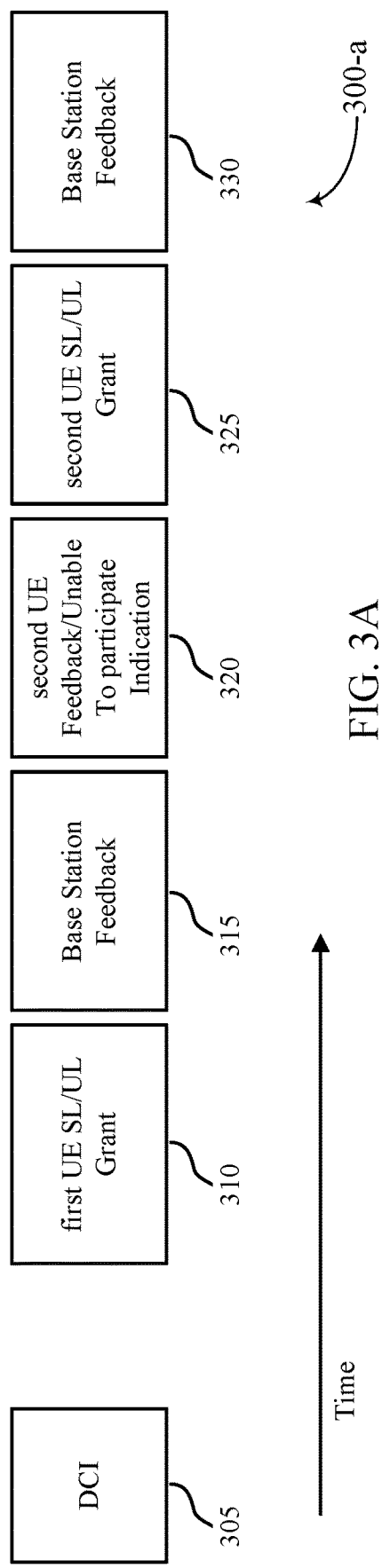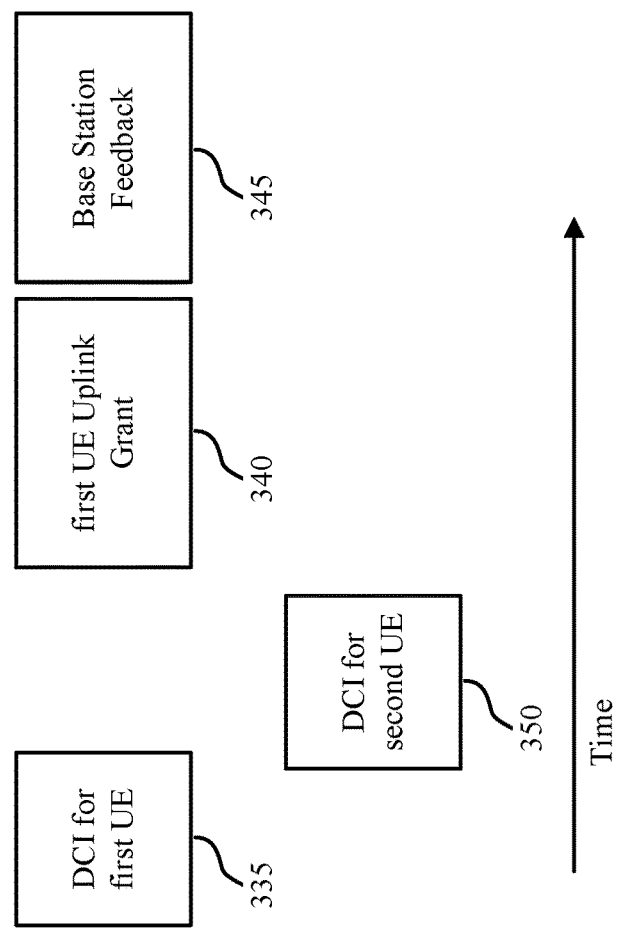
FIG. 3A
FIG. 3B

TECHNIQUES TO SUPPORT USER EQUIPMENT BASED RELAYING FOR COVERAGE ENHANCEMENT

CROSS REFERENCE

The present application for patent claims the benefit of U.S. Provisional Patent Application No. 63/081,450 by ELSHAFIE et al., entitled "TECHNIQUES TO SUPPORT USER EQUIPMENT BASED RELAYING FOR COVERAGE ENHANCEMENT," filed Sep. 22, 2020, assigned to the assignee hereof, and expressly incorporated by reference herein.

FIELD OF TECHNOLOGY

The following relates to wireless communications, including techniques to support user equipment based relaying for coverage enhancement.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support techniques to support user equipment based relaying for coverage enhancement. Generally, the described techniques provide for a base station configuring a source user equipment (UE) (e.g., a first UE) and a relay UE (e.g., second UE) with resources to utilize for relaying communications, for example, from the source UE to the base station via the relay UE. The base station may transmit one or more transmissions to the relay UE and the source UE, and the one or more transmissions may include a first grant for a first set of uplink resources for the source UE and a second grant for a second set of uplink resources for a relay UE. The first grant may assign the first set of resources for a source data transmission by the source UE. The second grant may assign the second set of resources for a relay data transmission by the relay UE. The source UE and the relay UE may communicate with the other of the source UE or the relay UE, or the base station, or both, based at least in part on the first grant, or the second grant, or both.

A method for wireless communications at a first UE is described. The method may include receiving, from a base station, a transmission that includes a first grant for a first set of resources for the first UE and a second grant for a second set of resources for a second UE, determining that the first grant assigns the first set of resources for a source data transmission by the first UE and assigns the second set of resources for the second UE to use for relaying the source data transmission from the first UE to the base station, and transmitting the source data transmission to the second UE and the base station using the first set of resources.

An apparatus for wireless communications at a first UE is described. The apparatus may include a processor, memory coupled with the processor, and instructions stored in the memory. The instructions may be executable by the processor to cause the apparatus to receive, from a base station, a transmission that includes a first grant for a first set of resources for the first UE and a second grant for a second set of resources for a second UE, determine that the first grant assigns the first set of resources for a source data transmission by the first UE and assigns the second set of resources for the second UE to use for relaying the source data transmission from the first UE to the base station, and transmit the source data transmission to the second UE and the base station using the first set of resources.

Another apparatus for wireless communications at a first UE is described. The apparatus may include means for receiving, from a base station, a transmission that includes a first grant for a first set of resources for the first UE and a second grant for a second set of resources for a second UE, means for determining that the first grant assigns the first set of resources for a source data transmission by the first UE and assigns the second set of resources for the second UE to use for relaying the source data transmission from the first UE to the base station, and means for transmitting the source data transmission to the second UE and the base station using the first set of resources.

A non-transitory computer-readable medium storing code for wireless communications at a first UE is described. The code may include instructions executable by a processor to receive, from a base station, a transmission that includes a first grant for a first set of resources for the first UE and a second grant for a second set of resources for a second UE, determine that the first grant assigns the first set of resources for a source data transmission by the first UE and assigns the second set of resources for the second UE to use for relaying the source data transmission from the first UE to the base station, and transmit the source data transmission to the second UE and the base station using the first set of resources.

In some examples of the method, apparatuses, and non-transitory computer-readable medium described herein, receiving the transmission may include operations, features, means, or instructions for receiving a packet addressed to the first UE that includes downlink control information indicating the first grant and the second grant, where determining that the first grant assigns the first set of resources and the second set of resources may be based on the downlink control information.

In some examples of the method, apparatuses, and non-transitory computer-readable medium described herein, receiving the transmission may include operations, features, means, or instructions for receiving the first grant for the first set of resources that includes a sidelink resource and an uplink resource, where the first UE communicates with the second UE using the sidelink resource and the base station using the uplink resource.

In some examples of the method, apparatuses, and non-transitory computer-readable medium described herein, receiving the transmission may include operations, features, means, or instructions for receiving a downlink control information message that assigns a resource that the second UE may be to use for transmitting feedback associated with a source data transmission by the first UE or for indicating that the second UE may be unable to participate in communications according to the second grant, where the communicating may be performed based on a transmission by the second UE using the feedback resource.

Some examples of the method, apparatuses, and non-transitory computer-readable medium described herein may further include operations, features, means, or instructions for receiving, from the second UE using a resource configured by the transmission, an indication that the second UE may be unable to participate in communications according to the second grant.

Some examples of the method, apparatuses, and non-transitory computer-readable medium described herein may further include operations, features, means, or instructions for receiving, from the second UE using a resource configured by the transmission, an indication of a duration during which the second UE may be unable to participate in relaying communications.

Some examples of the method, apparatuses, and non-transitory computer-readable medium described herein may further include operations, features, means, or instructions for receiving, from the second UE using a resource configured by the transmission, feedback associated with the source data transmission.

Some examples of the method, apparatuses, and non-transitory computer-readable medium described herein may further include operations, features, means, or instructions for receiving, from the second UE using a resource configured by the transmission, channel information that includes an indication of a transmission precoding matrix indicator, an indication of channel state information, or a combination thereof.

In some examples of the method, apparatuses, and non-transitory computer-readable medium described herein, receiving the channel information may include operations, features, means, or instructions for receiving the channel information with the indication that the second UE may be unable to participate in communications according to the second grant or with feedback associated with the source data transmission.

In some examples of the method, apparatuses, and non-transitory computer-readable medium described herein, receiving the channel information may include operations, features, means, or instructions for receiving the channel information in response to receiving the transmission including the second grant.

Some examples of the method, apparatuses, and non-transitory computer-readable medium described herein may further include operations, features, means, or instructions for monitoring a resource configured by the transmission for feedback, by the base station, associated with the source data transmission by the first UE.

Some examples of the method, apparatuses, and non-transitory computer-readable medium described herein may further include operations, features, means, or instructions for receiving, from the base station, a control message that activates feedback for the communications by the first UE using the first set of resources and monitoring, based on receiving the control message, a first downlink resource configured by the transmission for feedback by the base station associated with a source data transmission by the first UE.

Some examples of the method, apparatuses, and non-transitory computer-readable medium described herein may further include operations, features, means, or instructions for receiving, from the base station, a control message that activates the feedback for the source data transmission, where the first downlink resource may be monitored based on receiving the control message.

Some examples of the method, apparatuses, and non-transitory computer-readable medium described herein may further include operations, features, means, or instructions for receiving, from the base station, a downlink control information message that indicates that the UE may be to retransmit a source data transmission communicated to the base station via the second UE or via the first UE and retransmitting the source data transmission based on the downlink control information message.

Some examples of the method, apparatuses, and non-transitory computer-readable medium described herein may further include operations, features, means, or instructions for determining that the second UE retransmits the source data transmission using the second set of resources and monitoring, based on determining that the second UE retransmits the source data transmission, for feedback, by the base station, associated with the source data transmission.

A method for wireless communications at a second UE is described. The method may include receiving, from a base station, a transmission that includes a first grant for a first set of resources for a first UE and a second grant for a second set of resources for the second UE, determining that the first grant assigns the first set of resources for a source data transmission by the first UE and assigns the second set of resources for the second UE to use for relaying the source data transmission from the first UE to the base station, and communicating with one or more of the first UE or the base station based on the received transmission.

An apparatus for wireless communications at a second UE is described. The apparatus may include a processor, memory coupled with the processor, and instructions stored in the memory. The instructions may be executable by the processor to cause the apparatus to receive, from a base station, a transmission that includes a first grant for a first set of resources for a first UE and a second grant for a second set of resources for the second UE, determine that the first grant assigns the first set of resources for a source data transmission by the first UE and assigns the second set of resources for the second UE to use for relaying the source data transmission from the first UE to the base station, and communicate with one or more of the first UE or the base station based on the received transmission.

Another apparatus for wireless communications at a second UE is described. The apparatus may include means for receiving, from a base station, a transmission that includes a first grant for a first set of resources for a first UE and a second grant for a second set of resources for the second UE, means for determining that the first grant assigns the first set of resources for a source data transmission by the first UE and assigns the second set of resources for the second UE to use for relaying the source data transmission from the first UE to the base station, and means for communicating with one or more of the first UE or the base station based on the received transmission.

A non-transitory computer-readable medium storing code for wireless communications at a second UE is described.

The code may include instructions executable by a processor to receive, from a base station, a transmission that includes a first grant for a first set of resources for a first UE and a second grant for a second set of resources for the second UE, determine that the first grant assigns the first set of resources for a source data transmission by the first UE and assigns the second set of resources for the second UE to use for relaying the source data transmission from the first UE to the base station, and communicate with one or more of the first UE or the base station based on the received transmission.

In some examples of the method, apparatuses, and non-transitory computer-readable medium described herein, receiving the transmission including may include operations, features, means, or instructions for receiving a packet addressed to the first UE that includes downlink control information indicating the first grant and the second grant, where the second UE determines that the second grant assigns the first set of resources and the second set of resources based on the downlink control information.

In some examples of the method, apparatuses, and non-transitory computer-readable medium described herein, receiving the transmission may include operations, features, means, or instructions for receiving the first grant for the second set of resources that includes a sidelink resource and an uplink resource, where the second UE receives the source data transmission from the first UE using the sidelink resource, the second UE communicates with the base station using the uplink resource, or both.

In some examples of the method, apparatuses, and non-transitory computer-readable medium described herein, receiving the transmission may include operations, features, means, or instructions for receiving a downlink control information message that assigns a resources that the second UE may be to use for transmitting feedback associated with a source data transmission by the first UE or for indicating that the second UE may be unable to participate in communications according to the second grant, where the second UE communicates with the first UE or the base station base station based on the downlink control information message.

Some examples of the method, apparatuses, and non-transitory computer-readable medium described herein may further include operations, features, means, or instructions for transmitting, using a resource configured by the transmission, an indication that the second UE may be unable to participate in communications according to the second grant.

Some examples of the method, apparatuses, and non-transitory computer-readable medium described herein may further include operations, features, means, or instructions for transmitting, using a resource configured by the transmission, an indication of a duration during which the second UE may be unable to participate in relaying communications.

Some examples of the method, apparatuses, and non-transitory computer-readable medium described herein may further include operations, features, means, or instructions for receiving, from the first UE using the first set of resources, the source data transmission and transmitting, using a resource configured by the transmission, feedback associated with the source data transmission.

Some examples of the method, apparatuses, and non-transitory computer-readable medium described herein may further include operations, features, means, or instructions for transmitting, using a resource configured by the transmission, channel information that includes an indication of a transmission precoding matrix indicator, an indication of channel state information, or a combination thereof.

In some examples of the method, apparatuses, and non-transitory computer-readable medium described herein, transmitting the channel information may include operations, features, means, or instructions for transmitting the channel information with an indication that the second UE may be unable to participate in communications according to the second grant or with feedback associated with the source data transmission.

In some examples of the method, apparatuses, and non-transitory computer-readable medium described herein, transmitting the channel information may include operations, features, means, or instructions for transmitting the channel information in response to receiving the transmission including the second grant.

Some examples of the method, apparatuses, and non-transitory computer-readable medium described herein may further include operations, features, means, or instructions for receiving, from the base station via a resource configured by the transmission, feedback associated with the source data transmission by the first UE, where the communicating may be performed based on the feedback transmitted by the base station.

Some examples of the method, apparatuses, and non-transitory computer-readable medium described herein may further include operations, features, means, or instructions for refraining from communicating according to the second grant based on the feedback indicating that the base station was able to successfully decode the source data transmission.

Some examples of the method, apparatuses, and non-transitory computer-readable medium described herein may further include operations, features, means, or instructions for communicating according to the second grant based on the feedback indicating that the base station was unable to successfully decode the source data transmission.

Some examples of the method, apparatuses, and non-transitory computer-readable medium described herein may further include operations, features, means, or instructions for receiving, from the first UE using the first set of resources, the source data transmission and transmitting, to the base station using the second set of resources, the source data transmission.

Some examples of the method, apparatuses, and non-transitory computer-readable medium described herein may further include operations, features, means, or instructions for monitoring, based on transmitting the source data transmission, a resource configured by the transmission for feedback, by the base station, associated with the source data transmission transmitted by the second UE.

A method for wireless communications is described. The method may include generating a first grant that assigns a first set of resources for a source data transmission by a first UE, generating a second grant that assigns a second set of resources for a second UE, transmitting, to the first UE and the second UE, a transmission that includes the first grant and the second grant, and communicating with one or more of the first UE or the second UE based on transmitting the packet that includes the first grant and the second grant.

An apparatus for wireless communications is described. The apparatus may include a processor, memory coupled with the processor, and instructions stored in the memory. The instructions may be executable by the processor to cause the apparatus to generate a first grant that assigns a first set of resources for a source data transmission by a first UE, generate a second grant that assigns a second set of resources for a second UE, transmit, to the first UE and the second UE, a transmission that includes the first grant and the second grant, and communicate with one or more of the first UE or the second UE based on transmitting the packet that includes the first grant and the second grant.

Another apparatus for wireless communications is described. The apparatus may include means for generating a first grant that assigns a first set of resources for a source data transmission by a first UE, means for generating a second grant that assigns a second set of resources for a second UE, means for transmitting, to the first UE and the second UE, a transmission that includes the first grant and the second grant, and means for communicating with one or more of the first UE or the second UE based on transmitting the packet that includes the first grant and the second grant.

A non-transitory computer-readable medium storing code for wireless communications is described. The code may include instructions executable by a processor to generate a first grant that assigns a first set of resources for a source data transmission by a first UE, generate a second grant that assigns a second set of resources for a second UE, transmit, to the first UE and the second UE, a transmission that includes the first grant and the second grant, and communicate with one or more of the first UE or the second UE based on transmitting the packet that includes the first grant and the second grant.

BRIEF DESCRIPTION OF THE DRAWINGS

FIG. 3A and FIG. 3B illustrate examples of resource assignments that support techniques to support user equipment based relaying for coverage enhancement in accordance with aspects of the present disclosure.

DETAILED DESCRIPTION

Figure 1:
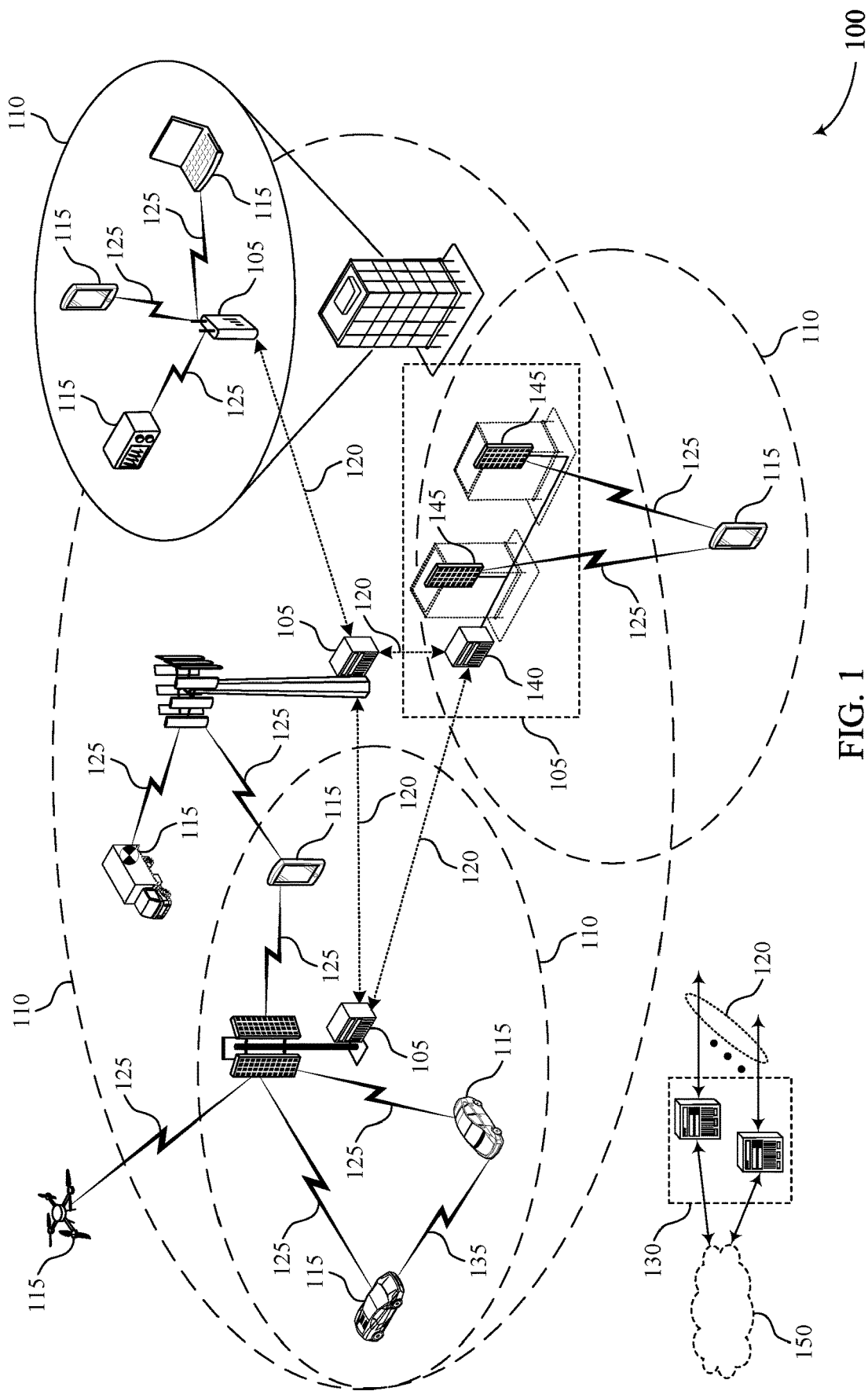
FIG. 1 illustrates an example of a system for wireless communications that supports techniques to support user equipment based relaying for coverage enhancement in accordance with aspects of the present disclosure.

In some wireless communications scenarios, a base station may transmit downlink communications to a set of UEs, but one or more of the UEs may not be able to communicate with the base station due to power constraints, radio link fading, or some other limiting condition. In such cases, a UE may function as a relay UE that may relay uplink communications from an impacted UE (which may be referred to as a source UE) to the base station. In such cases, the relay UE and the source UE may coordinate to configure a dedicated uplink tunnel to relay the data from the source UE to the base station when the source UE cannot communicate effectively with the base station.

Implementations described herein support coordination of resources for relaying. The base station may transmit a first grant that is assigned to the source UE and allocates a first set of resources, which may include uplink resources for the source UE, in addition to corresponding downlink resources for the base station to use for feedback for the source UEs uplink transmissions. Additionally, the base station may transmit a second grant that is assigned to the relay UE and allocates a second set of resources, which may include uplink resources for the relay to use for relaying the source uplink transmission, in addition to downlink resources for the base station to use for feedback for the relay's uplink transmissions. Resources may also be allocated for the relay UE to use for either feedback for the source transmission or to indicate that the relay is unable to participate in the relay in accordance with the grant. The first grant and the second grant may be transmitted in the same downlink control information (DCI) message (e.g., a group common DCI) or in separate DCI messages.

The configuration of the resources may allow the base station to receive the source transmission without the relay. In such cases, the base station may transmit an acknowledgement (ACK), and the resources that were allocated for the relay UE may be used for some other purpose, such as new data. When the relay UE sends a negative acknowledgement (NACK) or the base station sends an ACK associated with the source UE's original transmission, the resources allocated for the relay grant may go unused. In such cases, the source UE may use the relay grant to send a retransmission or a new transmission, or the base station may use this uplink grant for communicating with other UEs. These options may be configured via control signaling such as radio resource control (RRC) signaling, medium access control layer control layer (MAC-CE) signaling, or DCI signaling, and the base station may switch between these options via control signaling.

Particular aspects of the subject matter described herein may be implemented to realize one or more advantages. The described techniques may support improvements in the uplink communications framework by enhancing uplink coverage, decreasing signaling overhead, and improving reliability, among other advantages. As such, supported techniques may include improved network operations and, in some examples, may promote network efficiencies, among other benefits.

Aspects of the disclosure are initially described in the context of wireless communications systems. Aspects of the disclosure are further described with respect to a wireless communications system illustrating relaying communications, resource assignments illustrating relaying communications, and a process flow diagram Aspects of the disclosure are further illustrated by and described with reference to apparatus diagrams, system diagrams, and flowcharts that relate to techniques to support user equipment based relaying for coverage enhancement.

FIG. 1 illustrates an example of a wireless communications system 100 that supports techniques to support user equipment based relaying for coverage enhancement in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some scenarios, a base station 105 may transmit downlink communications to a set of UEs 115, but one or more of the UEs may not be able to transmit uplink communications to the base station 105 due to power constraints, radio link fading, or some other limiting condition. For example, a base station 105 may be able to transmit downlink communications to a UE 115 that is positioned at greater distance from the base station relative to other UEs 115 within a coverage area 110. Due to power limitations of the UE 115 (e.g., a base station 105 may support greater transmit powers), among other conditions or constraints, however, the UE 115 may not be able to transmit an uplink communication to the base station 105 such that the base station 105 receives the uplink transmission with adequate receive power. In some examples, another UE 115 may function as a relay UE that relays uplink communications from the impacted UE 115 to the base station 115. In such cases, the relay UE 115 and the impacted UE (e.g., a source UE) may coordinate to identify resources to use for relaying. However, relay coordination between UEs 115 may lead to inefficient resource utilization, channel congestion, and the like.

Implementations described herein support coordination of relaying communications. The base station may transmit a first grant and a second grant to one or more UEs 115. The first grant may be assigned to the source UE 115 and may allocate s set of resources (e.g., uplink resources and/or sidelink resources) for the source UE 115 to use for a source data transmission. The first grant may also allocate corresponding downlink resources that the base station 105 may use for feedback corresponding to the source data transmission. The second grant may be assigned to the relay UE 115 and may allocate a second set of resources (e.g., uplink and/or sidelink resources) that the relay is to use for relaying the source data transmission from the source UE 115 to the base station 105. The second grant may also allocate corresponding downlink resources that the base station 105 may use for feedback corresponding to the relay data transmission. The second grant may also grant resources for the relay UE 115 to use for feedback of the source data transmission or for indicating that the relay UE 115 is unable to participate in the relaying communications according to the second grant. The UEs 115 and the base station 105 may communicate based on the grants.

Figure 2:
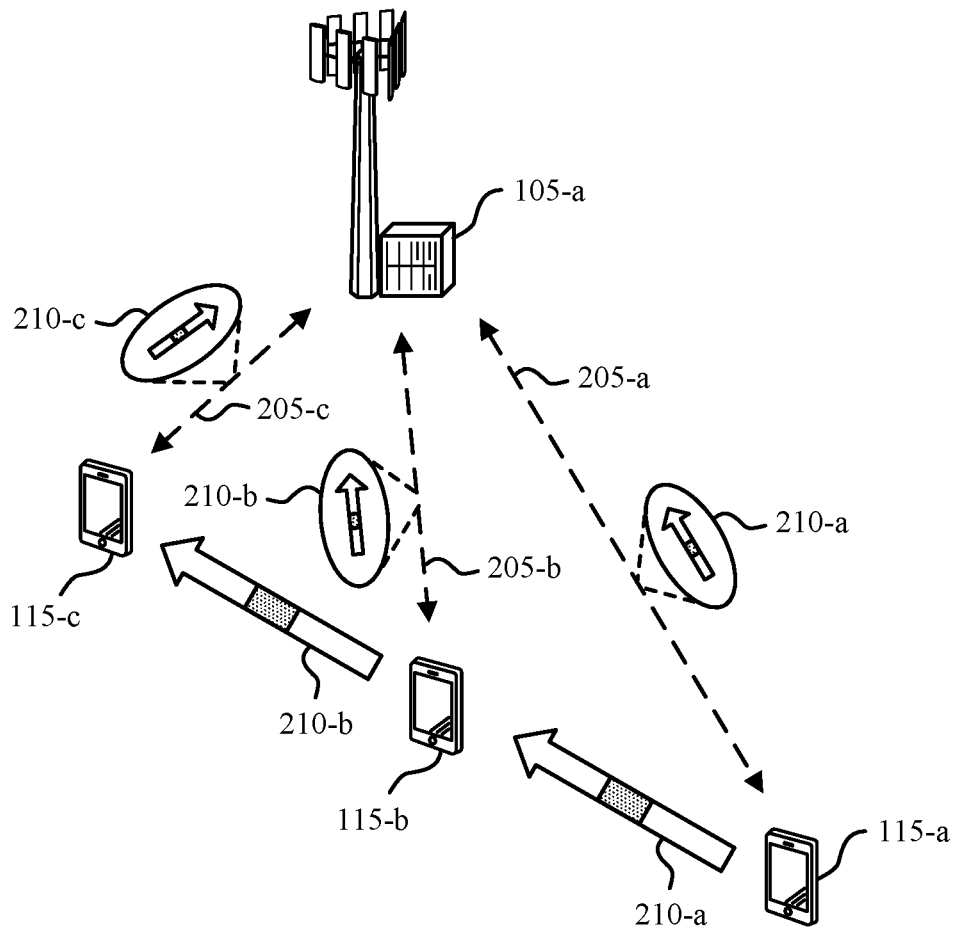
FIG. 2 illustrates an example of a wireless communications system that supports techniques to support user equipment based relaying for coverage enhancement in accordance with aspects of the present disclosure.

FIG. 2 illustrates an example of a wireless communications system 200 that supports techniques to support user equipment based relaying for coverage enhancement in accordance with aspects of the present disclosure. In some examples, wireless communications system 200 may implement or may be implemented by aspects of wireless communications system 100. The wireless communications system 200 includes a UE 115-a, a UE 115-b, a UE 115-c, and a base station 105-a, which may be examples of the corresponding devices of FIG. 1. The base station 105-a may support communications 205 with the UEs 115.

As described herein, the base station 105-a may transmit various downlink communications to the UEs 115. In some scenarios, the base station 105-a may be able to transmit downlink communications to the UEs 115, but the UEs 115 may not be able to transmit uplink communications to the base station 105-a. These scenarios may be due to power constraints or limitations at the UEs 115, radio link fading, or some other limiting condition. For example, the base station 105-a may be able to transmit a downlink transmission to UE 115-a, but the UE 115-a may not be able to transmit uplink communications to the base station 105-a due to the distance between the UE 115-a and the base station and limitations of transmit power at the UE 115-a. In such cases, another UE, such as UE 115-b, may function as a relay UE such as to relay a data transmission from the impacted UE 115-a (e.g., source UE 115-a) to relay data transmissions 210 from the source UE 115-a to the base station 105-a. In such cases, the participating UE 115-a and UE 115-b may coordinate to determine resources to relay a data transmission, such as data transmission 210-a from the source UE 115-a to the base station 105-a via the relay UE 115-b. However, coordination by the UEs 115 may cause interference with other UEs 115, may inefficiently utilize resources, etc.

Implementations described herein provide for more efficient relay coordination by various devices, such as base station 105-a. The base station 105-a may identify that relay coordination may assist in uplink communications for a UE 115. For example, the base station 105-a may determine to coordinate relay communications based on failure to receive feedback associated with a downlink communication, failure to decode an uplink communication, a reference signal received power (RSRP) being below a threshold for an uplink communication, a request by a UE 115, any combination thereof, or the like. As such, the base station 105-a may generate and transmit grants to the relay UE 115 and the source UE 115 that allocates resources for relaying communications. In the scenario described herein, the base station may generate and transmit a first grant for the source UE 115-c and a second grant for the relay UE 115-b. The grants may specify respective resources (e.g., uplink and/or sidelink resources) that each UE 115 is to use for the relay communications, and in some cases, downlink resources that the base station 105-a is to use for feedback that corresponds to the uplink resources. The grants (e.g., the first grant, the second grant, or both) may also specify resources (e.g., feedback resources) for the relay UE 115-b to use for feedback for the source data transmission by the source UE 115-a or to indicate that the relay UE 115-b is unable to participate in the relay communications The first and second grant may be indicated in the same downlink control signal. For example, the base station 105-a may transmit a physical downlink control channel (PDCCH) with downlink control information (DCI) that indicates the first and second grant. As such, as described in further detail herein, the UEs 115-a may be able to identify respective resources for transmission, monitor feedback resources, and behave based on the feedback resources. In such cases, the DCI may be a group common DCI. In some examples, the base station 105-a may transmit separate DCIs with the respective grants. For example, the base station 105-a may transmit a first DCI that includes the first grant to the source UE 115-a and a second DCI that includes the second grant to the relay UE 115-b.

After receiving the first grant, the source UE 115-b may transmit an uplink data transmission 210-a (e.g., a source data transmission) in an uplink resource of the first set of resource configured by the uplink grant. The source UE 115-b may also transmit the source data transmission in a sidelink resource configured by the uplink grant. The relay UE 115-b and the base station 105-b may attempt to decode the transmission and transmit corresponding HARQ-ACK feedback in the respective resources. In some cases, the base station 105-a may be able to decode the source data transmission 210-a without relaying by the relay UE 115-b. In other cases, the base station 105-a transmits a NACK, and the relay UE 115-b decodes and retransmits the source data transmission to the base station (e.g., a relay data transmission) as data transmission 210-b. One or both of the relay UE 115-b and the source UE 115-a may monitor the base station 105-a feedback corresponding to the relay data transmission in case of decoding failure.

In some cases, the relay UE 115-b may be unable to participate in or otherwise ineffective in participating in the relaying. This may be due to low battery status, inability to perform the processing, because the relay UE 115-b is participating with other uplink communications, downlink communications, or relaying tasks, or because of channel conditions. In such cases, the relay UE 115-b may indicate that it is unable to participate in the relaying using hybrid automatic repeat request (HARQ)-ACK physical uplink control channel (PUCCH) signaling in the feedback resources configured for the relay UE 115-b. For example, the relay UE 115-b broadcasts a "noParticipation" or "skipRelaying" signal (e.g., a bit or field indication in the PUCCH).

As described in further detail with respect to FIG. 3, the second uplink grant that is configured for the relay UE 115-b may be used for other purposes when the relay UE 115-b indicates that it is unable to participate. For example, the source UE 115-a may use the relay grant to send an uplink transmission, such as a new transmission or a retransmission. In other cases, the base station 105-a may cancel the uplink grant and use the resources for other UEs 115. These options may be configured by the base station via RRC, MAC-CE, or in the DCI. The options may also be used when the relay UE sends a NACK corresponding to the data transmission in the feedback resources (instead of the unable to participate indication) or when the base station 105-*a* indicates that the base station 105-*a* was able to decode the source data transmission by the source UE 115-*b* without the relaying. In any of these scenarios, the second uplink resource configured by the second grant for the relay UE 115-*b* may not be used for relaying and thus may be available for other use, such as a transmission/retransmission by the source UE 115-*b* or for use by other UE 115.

It should be understood that the implementations described herein may be used to configure relaying communication between multiple UEs, as illustrated in FIG. 2, among other examples. For example, the base station 105-*a* may configure the UE 115-*a* as the source UE for transmitting data transmission 210-*a* and the UE 115-*b* as the relay UE to transmit the data transmission 210-*b* to the UE 115-*c*. Thus, the base station 105-*a* may also configure the UE 115-*b* as the source UE to transmit the data transmission 210-*b* (which may be a retransmission of the data transmission 210-*a*) and the UE 115-*c* as the relay UE to transmit a data transmission 210-*c*. The UE 115-*b* may be considered both a relay UE and a source UE, in various examples, as described herein.

FIG. 3A and FIG. 3B illustrate examples of resource assignments 300 that support techniques to support user equipment based relaying for coverage enhancement in accordance with aspects of the present disclosure. In some examples, resource assignments 300 may be implemented by aspects of wireless communications system 100 and wireless communications system 200. The resource assignments may be configured by a base station 105 in response to determining that relay UE is to relay an uplink transmission by a source UE.

In the resource assignment 300-*a* of FIG. 3A, a base station may transmit a DCI message 305, which may be an example of a common uplink DCI. The DCI message 305 may be transmitted using a single UE packet and may include two grants in some examples. The DCI message 305 may indicate a grant for a first set of resources 310 (e.g., first uplink resource), which may be an uplink grant for a source UE 115. In some cases, the first grant may configure corresponding downlink resource 315 for base station feedback (e.g., HARQ-ACK feedback) corresponding to a source data transmission that is to be transmitted in a first uplink resource of the first set of resources 310. The DCI may also indicate a feedback resource 320 that a relay UE 115 may use to transmit feedback for the source data transmission in the first uplink resource or to indicate that the relay UE 115 is unable to participate in the relaying according to the DCI (e.g., the first or second grant). The second grant included in the DCI message 305 may indicate a second set of resources 325 (e.g., an uplink resource) (e.g., a relay UE uplink grant) that the relay UE may use to relay the source data transmission to the base station 105. The second grant may include an indication of second downlink resources that the base station 105 may use to transmit feedback corresponding to the second set of resources 325.

In some examples, the first set of resources 310 configured by the first uplink grant may also include sidelink resources in addition to the uplink resources. The sidelink resources may be used for the source data transmission between the source UE and the relay UE. Thus, the first set of resources may include uplink resources for the source data transmission by the source UE to the base station and sidelink resources for the source data transmission by the source UE to the relay UE. The uplink and sidelink resources may be overlapping, non-overlapping, contiguous, or in other time and/or frequency domain configurations, depending on the first grant.

Additionally or alternatively, the second set of resources 325 configured by the second grant of the DCI message 305 may also include sidelink resources in addition to the uplink resources. The sidelink resources may be used when the relay UE is to relay communications with another relay UE for relaying communications with the base station. Thus, the second set of resources may include uplink resources for relaying of the source data transmission from the source UE base station by the relay UE and sidelink resources for relaying of the source data transmission from the source UE to another relay UE. The uplink and sidelink resources may be overlapping, non-overlapping, contiguous, or in other time and/or frequency domain configurations, depending on the first grant.

The DCI message 305 may indicate offsets corresponding to the beginning of each respective resource, offsets between each respective resources, or a combination of these. The offsets to the beginning of each respective resource may be relative to the DCI message 305. For example, the DCI may indicate N1, which indicates an offset from the DCI to the first uplink resource of the first set of resources, N2, which indicates an offset from the DCI to the first downlink resource 315, etc. Similarly, the DCI may indicate gaps between the resources. Each offset or N may be in terms of slot durations, symbol duration, or some other transmission time interval duration.

The configuration of the resources may support efficient resource utilization and feedback indication. After receiving the DCI message 305, the source UE may transmit a source data transmission in an t uplink resource of the first set of resources 310. As described, the source UE may also transmit the source data transmission in a first sidelink resource of the first set of resources 310. The relay UE and the base station 105 may attempt to decode the source data transmission and generate feedback corresponding to the source data transmission. The source UE and the relay UE may further monitor the first downlink resource 315 for HARQ-ACK feedback by the base station. In some cases, the base station may be able to decode the source data transmission without relaying by the relay UE. However, in some cases, the base station may transmit a NACK or indication that it was unable to decode the source data transmission. The source UE and the base station may monitor the feedback resource 320 for feedback by the relay UE or an indication that the relay UE is unable to participate in the relaying. If the relay UE is able to decode the source data transmission (e.g., the relay UE sends an ACK in the feedback resource 320), then the relay UE may retransmit the source data transmission in the second set of resources 325. The relay UE and the source UE may then monitor the second downlink resource 330 for feedback by the base station.

In some scenarios, the relay uplink grant (e.g., second set of resources 325) may be unused for the relaying. As described herein, if the relay UE is unable to participate in the relaying, using HARQ-ACK PUCCH signaling in the feedback resource 320 the relay may broadcast a "noParticipation" signal, a "skipRelaying" signal, or the like. The relay UE may be unable to participate due to low battery status, inability to perform the processing, or because the relay UE is busy performing other uplink, downlink, or relaying tasks, among other reasons. If the relay is unable to participate or sends a NACK in the feedback resource 320 (e.g., in case of decode-and-forward (DF) relaying), or if the base station transmits an ACK in the first downlink resource 315, then the relay UE uplink grant (e.g., second set of resources 325) may be unused for relaying. In such cases, the source UE may utilize the relay grant (e.g., second set of resources 325) to send a data transmission. For example, if the base station was able to decode the source data transmission of the first set of resources 310 (e.g., a cyclic redundancy check (CRC) pass), then the source UE may transmit new data. If the base station transmits a NACK in the first downlink resource 315 and the relay UE is unable to participate or also sends a NACK, then the source UE may use the relay UE uplink grant to retransmit the source data transmission. In some cases, however, the base station may cancel the relay UE uplink grant (e.g., the second set of resources 325) and reuse these resources for other UEs (e.g., for other communications involving one or more other UEs).

The relay UE may perform decode-and-forward relaying (DF) relaying or amplify-and-forward (AF) relaying. As described herein, if the relay UE is performing DF relaying and is able to decode the source data transmission correctly (CRC pass), then the relay UE may transmit an ACK in the feedback resource 320. If the relay UE is performing DF relaying and is unable to decode the source data transmission of the first set of resources 310 (CRC fail), then the relay UE may transmit a NACK in the feedback resource 320. In such cases, as described herein, the second uplink grant (e.g., second set of resources 325) may be canceled or used by the source UE to retransmit the source data transmission (e.g., if the base station transmits a NACK in downlink resource 315) or transmit new data (e.g., if the base station transmits an ACK in downlink resource 315). For AF relaying, the base station and the source UE may consider whether the relay UE transmits an unable to participate indication in the feedback resource 320.

The base station may configure the behavior for the UEs when the second uplink resource may go unused due to the relay UE being unable to participate, the relay UE transmitting a NACK, and/or the base station transmitting an ACK. The base station may transmit control signaling to indicate the UE behavior when one of the scenarios occurs. For example, the base station may transmit a RRC or MAC-CE message that configures the source UE behavior based on or more of the above scenarios. In other cases, the source UE behavior is configured in the DCI message 305. Further, the base station may switch UE behavior using RRC or MAC-CE messaging or dynamically by including an indication in the DCI configuring the uplink communications.

In some examples, the HARQ-ACK feedback for relaying may be optional in order to reduce the amount of signaling. For example, the base station may indicate (e.g., via MAC-CE or RRC signaling) whether the base station and/or the relay UE is to provide feedback for the source data transmission. Thus, if activated, the base station and/or the relay UE may provide feedback in configured resources, such as base station feedback resources (e.g., downlink resource 315), base station feedback resources (e.g., second downlink resource 330), and relay UE feedback resources 320.

As described herein, the feedback resources 320 may be used by the relay UE for transmitting feedback associated with the source data transmission by the source UE or for indicating that the relay UE is unable to participate in the relaying according to the second grant of the DCI message 305. In some cases, the relay UE may include additional information associated with these transmissions. For example, if the relay UE is unable to participate, then the relay may include a time period or duration during which the relay UE is unable to participate in the relaying such as to prevent the source UE and the base station from requesting the relay transmission during the time period. Additionally or alternatively, the relay UE may include channel information associated with the link between the relay UE and the source UE in the feedback resources 320. For example, the relay UE may transmit a CSI report (e.g., TCQI), a transmission precoding matrix indicator (TPMI), or the like. In some cases, the relay UE may generate this report prior to receiving the relaying configuration (e.g., the DCI message 305) and transmit the report upon receiving the relaying configuration (e.g., the DCI message 305). The relay UE may include the unable to participate duration, the channel quality information, or both. The channel quality information may also be transmitted with feedback for the source data transmission by the source UE.

In FIG. 3B, the resource assignment 300-b includes separate DCIs for the source UE and the relay UE. A first DCI 335 for the source UE includes the first grant that assigns a first uplink resource 340 that the source UE is to use to send a source data transmission and corresponding first downlink resources 345 that the base station is to use to transmit feedback for the source data transmission. A second DCI 350 for the relay UE includes the second grant that assigns the second uplink resource 355 that the relay UE is to use to send the relay data transmission and corresponding second downlink resources 360 that the base station is to use to transmit feedback for the relay data transmission. In some examples, using separate DCIs to indicate the first and second grants may provide additional scheduling flexibility relative to including both grants in a DCI. For example, the first DCI may grant the resources for the source UE, and then the second DCI may grant the resources for the relay UE at a later time, due to channel conditions associated with the relay UE, or some other condition. In one example, the first grant indicated by the first DCI may not include a grant for the first downlink resources 345 for the feedback if the base station has identified that the base station does not have a direct or adequate link with the source UE. Further, using one DCI or separate DCIs may support various UE behaviors as described herein. In one example, using the separate DCIs may allowed the relay UE avoid transmission of feedback for the source data transmission. That is, the feedback resource 320 illustrated in FIG. 3A may not be allocated when using separate DCIs, as illustrated in FIG. 3B.

Figure 4:
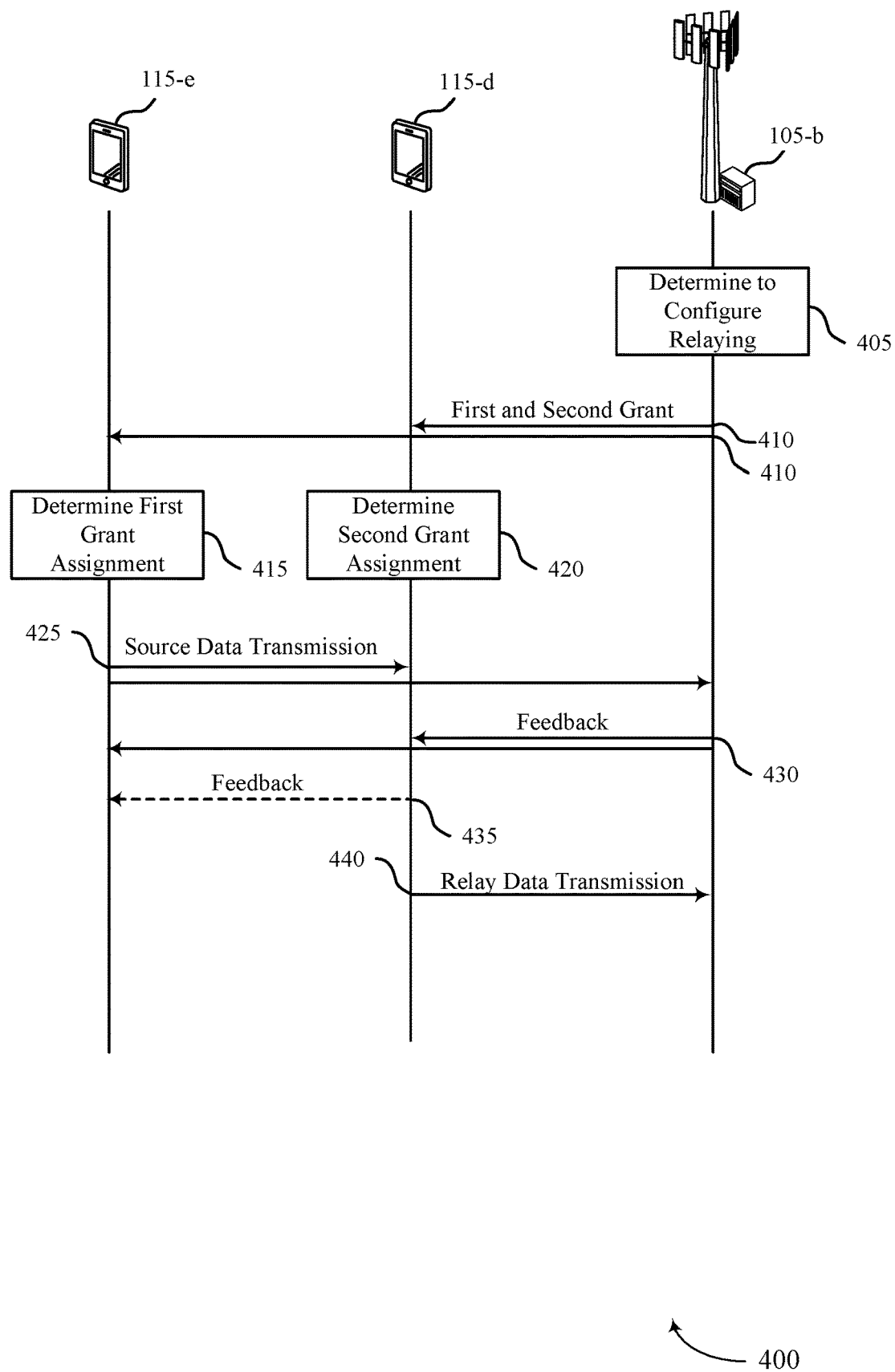
FIG. 4 illustrates an example of a process flow diagram that supports techniques to support user equipment based relaying for coverage enhancement in accordance with aspects of the present disclosure.

FIG. 4 illustrates an example of a process flow diagram 400 that supports techniques to support user equipment based relaying for coverage enhancement in accordance with aspects of the present disclosure. In some examples, process flow diagram 400 may be implemented by aspects of wireless communications system 100. The process flow diagram 400 includes a base station 105-b, a UE 115-d, and a UE 115-c, which may be examples of the corresponding devices illustrated and described with respect to FIGS. 1 through 3.

At 405, the base station 105-b may determine to configure relaying with one or more UEs 115. For example, the base station 105-b may determine to configure relaying based on being unable to decode a transmission by the UE 115-c, based on a RSRP of a transmission by the UE 115-c or based on some other condition. The base station may generate a first grant for the UE 115-c, which may be example of the source UE, and a second grant for the UE 115-d, which may be example of the relay UE.

At 410, the source UE 115-c may receive, from the base station 105-b, one or more transmissions that include a first grant for the source UE associated with a first uplink resource and a second grant for a relay UE associated with a second uplink resource. The first grant may include a first set of resources (e.g., uplink and/or sidelink resources), and the second grant may include a second set of resources (e.g., uplink and/or sidelink resources). Similarly, at 415, the relay UE 115-*d* may receive, from the base station 105-*b*, one or more transmissions that include the first grant for the source UE and the second grant for the relay UE associated with a second uplink resource. In some cases, the first and second grant are indicated by a common DCI that is included in a packet or PDCCH transmission by the base station 105-*b*. In other examples, the first grant is transmitted via a first DCI, and the second grant is indicated via a separate second DCI.

At 415, the source UE 115-*c* may determine that the first grant assigns the first set of resources for a source data transmission by the source UE, and in some cases, assigns a first downlink resource for feedback by the base station associated with the source data transmission. At 420, the relay UE 115-*d* may determine that the second grant assigns the second set of resources for a relay data transmission by the relay UE, and in some cases, a second downlink resource for feedback by the base station associated with the relay data transmission. In some cases, the source UE 115-*c* may identify the second uplink resource and the second downlink resource configured for the relay data transmission and feedback, and the relay UE 115-*d* may identify the first uplink resource and the first downlink resource configured for the source data transmission and feedback. In some examples, the first grant, the second grant, or both, may configure feedback resources that the relay UE 115-*d* is to use for transmitting feedback corresponding to the source data transmission or to indicate that the relay UE 115-*d* is unable to participate in the relay communications according to the grants.

After receiving the grant assignments, the source UE 115-*c*, the relay UE 115-*d* and the base station 105-*b* may communicate according to the respective grants. For example, at 425, the source UE 115-*c* may transmit a source data transmission using the first uplink resource configured by the first grant. The source data transmission may be received by the relay UE 115-*d* and the base station 105-*b*. At 430, the base station 105-*b* may transmit feedback associated with the source data transmission using the first downlink resource. In some examples, the base station 105-*b* may indicate that it was able to decode the source data transmission by transmitting a ACK using the first downlink resource. In some examples, the base station 105-*b* may indicate that it was unable to decode the source data transmission by transmitting a NACK using the first downlink resource, among other options.

If the relay UE is performing DF relaying, at 435, the relay UE 115-*d* may transmit feedback corresponding to the source data transmission using the feedback resource. In some cases, the relay UE 115-*d* may include, with the feedback, an indication of channel information (e.g., CSI report and/or TPMI). At 440, the relay UE 115-*d* may transmit a relay data transmission to the base station 105-*b*, and the relay data transmission may be a relay of the source data transmission by the source UE 115-*e*.

In some examples, the relay UE 115-*d* may indicate (e.g., in feedback resources) that it is unable to participate in the relaying according to the second grant. The relay UE 115-*d* may also indicate a duration of being unable to participate and channel information (e.g., CSI report and/or TPMI).

As described herein, in some cases, the second uplink resources configured by the second grant may be unused for relaying purposes. For example, if the relay UE 115-*d* indicates that it is unable to participate in the relaying, then the second uplink resources may be unused for relaying purposes. Similarly, the relay UE 115-*b* may indicate at 435, that it was unable to decode the source data transmission and thus the second uplink resource may not be used for relaying purposes. As another example, the base station may transmit an ACK at 430, indicating that the base station 105-*b* was able to successfully decode the source data transmission. Thus, the second uplink resource may not be used for relaying purposes. As described herein, when the second uplink resource may not be used, the source UE may, among other options, retransmit the source data transmission (based on a NACK by the base station 105-*b* or the relay UE 115-*d*) or transmit new data (based on an ACK by the base station 105-*b*). In some cases, however, the base station 105-*b* may use the second uplink resources (and corresponding feedback resources) for other UEs 115, and thus, the source UE 115-*e* may not use the resources. The behaviors by the source UE 115-*e* may be configured via control signaling by the base station 105-*b*.

Figure 5:
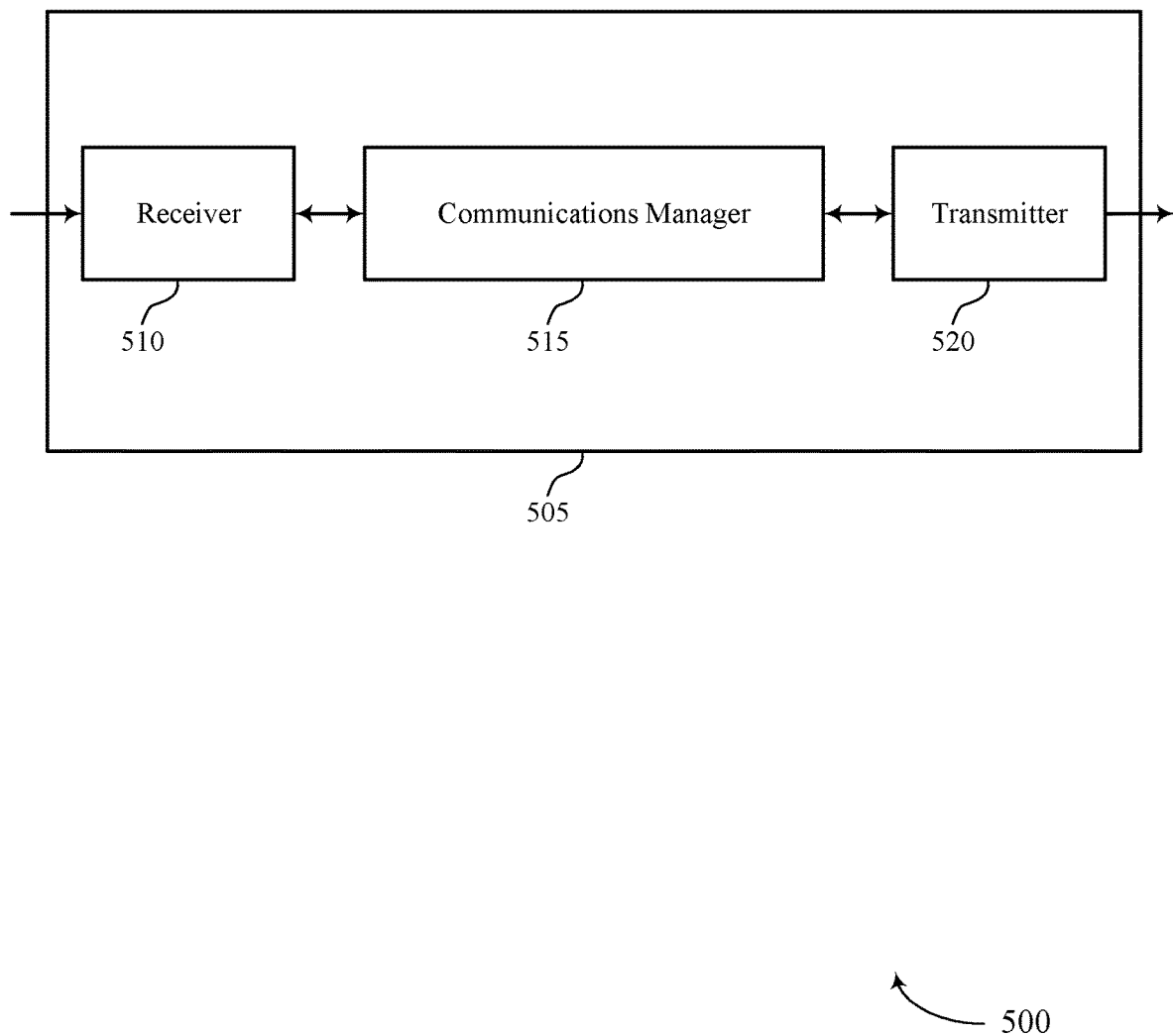
FIGS. 5 and 6 show block diagrams of devices that support techniques to support user equipment based relaying for coverage enhancement with aspects of the present disclosure.

FIG. 5 shows a block diagram 500 of a device 505 that supports techniques to support user equipment based relaying for coverage enhancement in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to techniques to support user equipment based relaying for coverage enhancement, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, from a base station, one or more transmissions that include a first grant for the first UE associated with a first uplink resource and a second grant for a second UE associated with a second uplink resource. The communications manager 515 may determine that the first grant assigns the first uplink resource for a source data transmission by the first UE and assigns a first downlink resource for feedback by the base station associated with the source data transmission. The communications manager 515 may communicate with one or more of the second UE or the base station based on the first grant for the first UE. The communications manager 515 may also receive, from a base station, one or more transmissions that include a first grant for the first UE associated with a first uplink resource and a second grant for the second UE associated with a second uplink resource. The communications manager 515 may determine that the second grant assigns the second uplink resource for a relay data transmission by a second UE and a second downlink resource for feedback by the base station associated with the relay data transmission. The communications manager 515 may communicate with one or more of the first UE or the base station based on the second grant. The communications manager 515 may be an example of aspects of the communications manager 810 described herein.

The communications manager communications manager 515 may support wireless communications at a first UE in accordance with examples as disclosed herein. For example, the communications manager 515 may be configured as or otherwise support a means for receiving, from a base station, a transmission that includes a first grant for a first set of resources for the first UE and a second grant for a second set of resources for a second UE. The communications manager 515 may be configured as or otherwise support a means for determining that the first grant assigns the first set of resources for a source data transmission by the first UE and assigns the second set of resources for the second UE to use for relaying the source data transmission from the first UE to the base station. The communications manager 515 may be configured as or otherwise support a means for transmitting the source data transmission to the second UE and the base station using the first set of resources.

Additionally or alternatively, the communications manager 515 may support wireless communications at a second UE in accordance with examples as disclosed herein. For example, the communications manager 515 may be configured as or otherwise support a means for receiving, from a base station, a transmission that includes a first grant for a first set of resources for a first UE and a second grant for a second set of resources for the second UE. The communications manager 515 may be configured as or otherwise support a means for determining that the first grant assigns the first set of resources for a source data transmission by the first UE and assigns the second set of resources for the second UE to use for relaying the source data transmission from the first UE to the base station. The communications manager communications manager 515 may be configured as or otherwise support a means for communicating with one or more of the first UE or the base station based on the received transmission.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some examples, the communications manager 515 may be implemented as an integrated circuit or chipset for a mobile device modem, and the receiver 510 and transmitter 520 may be implemented as analog components (e.g., amplifiers, filters, antennas) coupled with the mobile device modem to enable wireless transmission and reception over one or more bands.

The communications manager 515 as described herein may be implemented to realize one or more potential advantages. One implementation may allow the device 505 to more efficiently transmit uplink communications between the device 505 and one or more other devices, and more specifically to coordinate relay communications. For example, the device 505 may receive one or more grants and identify resources to use for relay communications, based on received downlink control signaling.

Based on implementing the relay mechanism techniques as described herein, a processor of a UE 115 (e.g., controlling the receiver 510, the transmitter 520, or the transceiver 820 as described with reference to FIG. 8) may increase reliability and decrease signaling overhead in the relay communications because the relay communications may be configured by a base station 105 instead of being coordinated between UEs 115.

Figure 6:
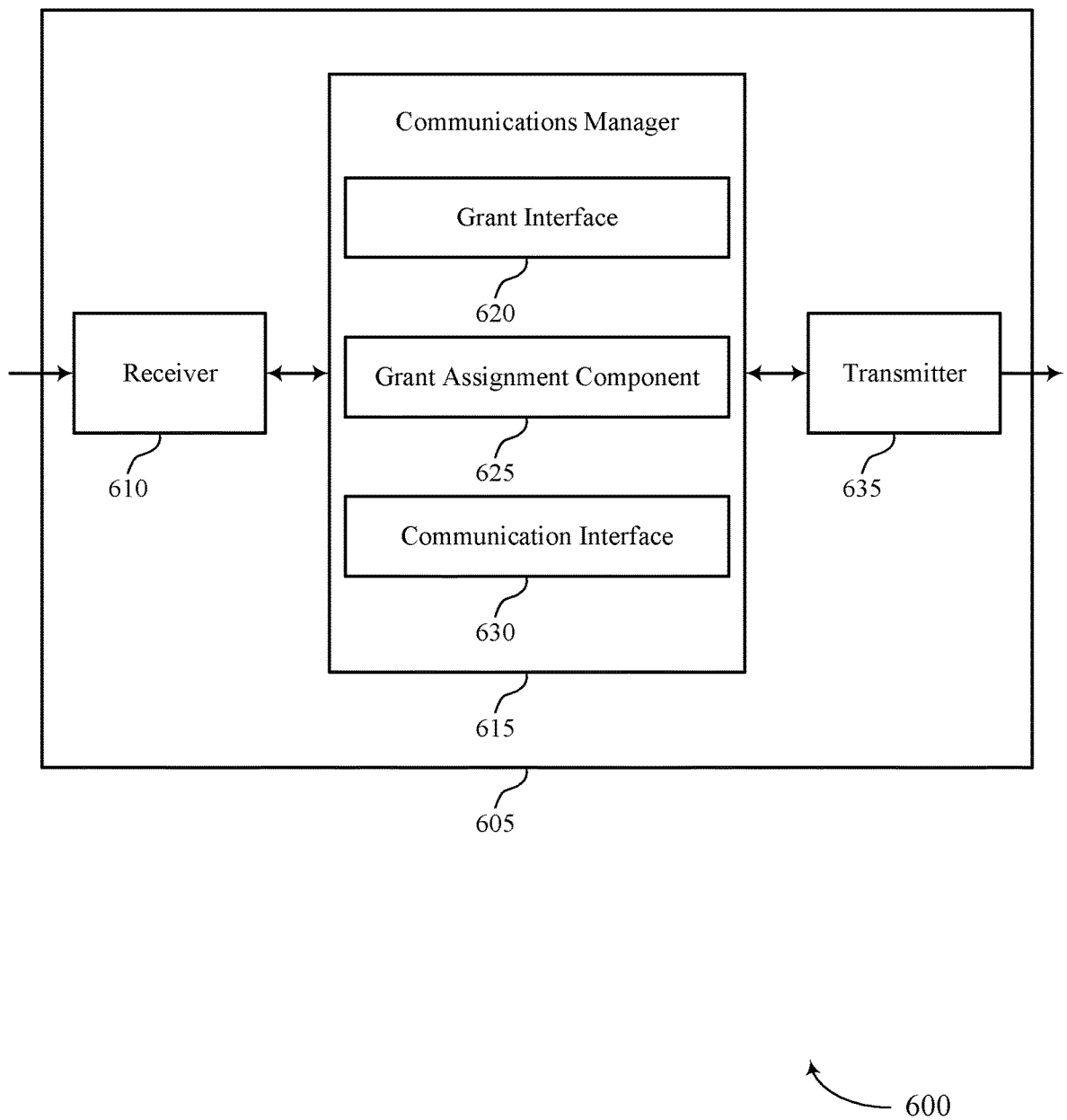

FIG. 6 shows a block diagram 600 of a device 605 that supports techniques to support user equipment based relaying for coverage enhancement in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to techniques to support user equipment based relaying for coverage enhancement, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a grant interface 620, a grant assignment component 625, and a communication interface 630. The communications manager 615 may be an example of aspects of the communications manager 810 described herein.

The grant interface 620 may receive, from a base station, one or more transmissions that include a first grant for the first UE associated with a first uplink resource and a second grant for a second UE associated with a second uplink resource.

The grant assignment component 625 may determine that the first grant assigns the first uplink resource for a source data transmission by the first UE and assigns a first downlink resource for feedback by the base station associated with the source data transmission.

The communication interface 630 may communicate with one or more of the second UE or the base station based on the first grant for the first UE.

The grant interface 620 may receive, from a base station, one or more transmissions that include a first grant for the first UE associated with a first uplink resource and a second grant for the second UE associated with a second uplink resource.

The grant assignment component 625 may determine that the second grant assigns the second uplink resource for a relay data transmission by a second UE and a second downlink resource for feedback by the base station associated with the relay data transmission.

The communication interface 630 may communicate with one or more of the first UE or the base station based on the second grant.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

The communications manager 615 may support wireless communications at a first UE in accordance with examples as disclosed herein. The grant interface 620 may be configured as or otherwise support a means for receiving, from a base station, a transmission that includes a first grant for a first set of resources for the first UE and a second grant for a second set of resources for a second UE. The grant assignment component 625 may be configured as or otherwise support a means for determining that the first grant assigns the first set of resources for a source data transmission by the first UE and assigns the second set of resources for the second UE to use for relaying the source data transmission from the first UE to the base station. The communication interface 630 may be configured as or otherwise support a means for transmitting the source data transmission to the second UE and the base station using the first set of resources.

Additionally or alternatively, the communications manager 615 may support wireless communications at a second UE in accordance with examples as disclosed herein. The grant interface 620 may be configured as or otherwise support a means for receiving, from a base station, a transmission that includes a first grant for a first set of resources for a first UE and a second grant for a second set of resources for the second UE. The grant assignment component 625 may be configured as or otherwise support a means for determining that the first grant assigns the first set of resources for a source data transmission by the first UE and assigns the second set of resources for the second UE to use for relaying the source data transmission from the first UE to the base station. The communication interface 630 may be configured as or otherwise support a means for communicating with one or more of the first UE or the base station based on the received transmission.

Figure 7:
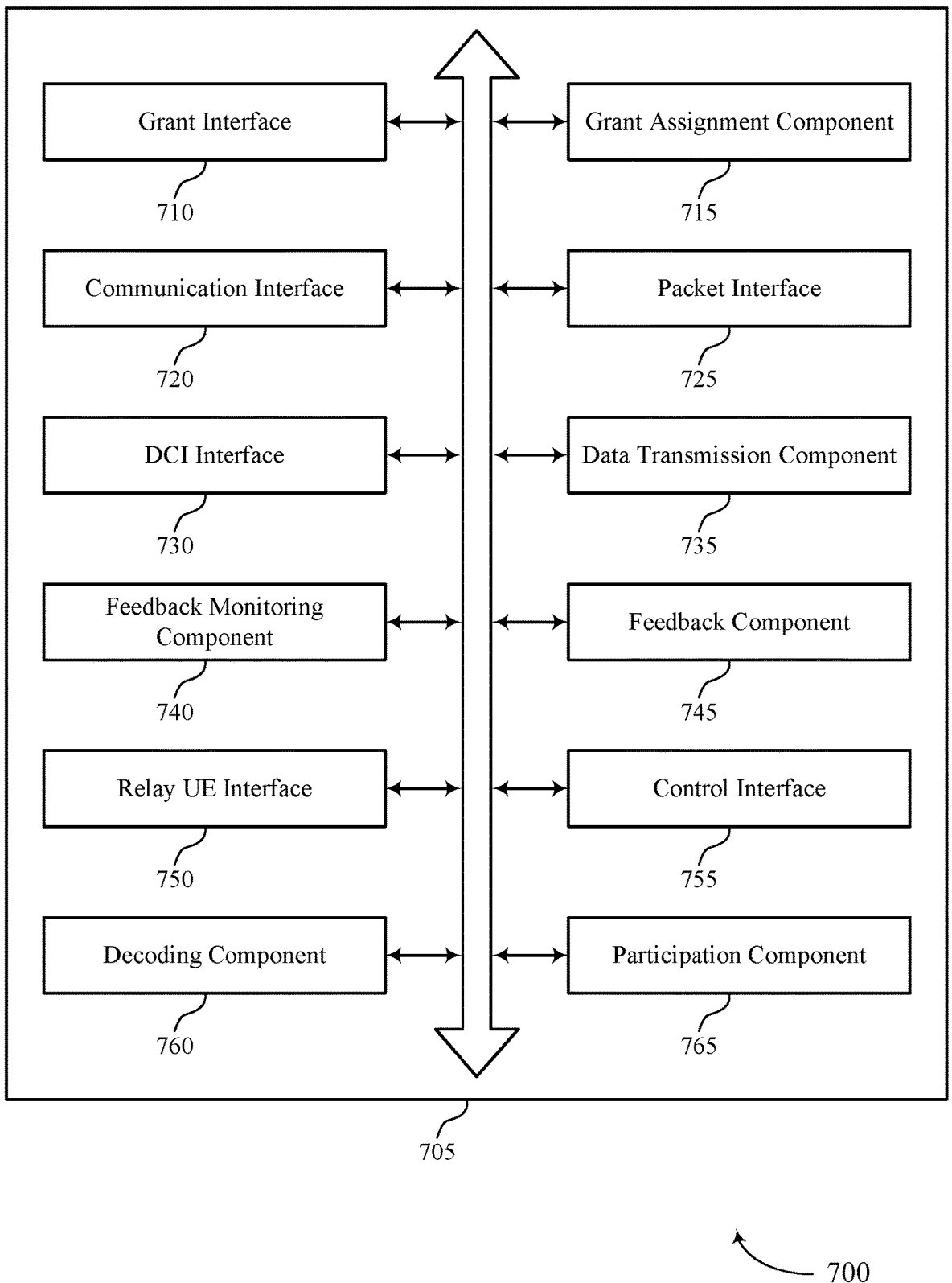
FIG. 7 shows a block diagram of a communications manager that supports techniques to support user equipment based relaying for coverage enhancement in accordance with aspects of the present disclosure.

FIG. 7 shows a block diagram 700 of a communications manager 705 that supports techniques to support user equipment based relaying for coverage enhancement in accordance with aspects of the present disclosure. The communications manager 705 may be an example of aspects of a communications manager 515, a communications manager 615, or a communications manager 810 described herein. The communications manager 705 may include a grant interface 710, a grant assignment component 715, a communication interface 720, a packet interface 725, a DCI interface 730, a data transmission component 735, a feedback monitoring component 740, a feedback component 745, a second UE interface 750, a control interface 755, a decoding component 760, and a participation component 765. Each of these modules may communicate, directly or indirectly, with one another (e.g., via one or more buses).

The grant interface 710 may receive, from a base station, one or more transmissions that include a first grant for the first UE associated with a first uplink resource and a second grant for a second UE associated with a second uplink resource.

In some examples, the grant interface 710 may receive, from a base station, one or more transmissions that include a first grant for the first UE associated with a first uplink resource and a second grant for the second UE associated with a second uplink resource.

The grant assignment component 715 may determine that the first grant assigns the first uplink resource for a source data transmission by the first UE and assigns a first downlink resource for feedback by the base station associated with the source data transmission.

In some examples, the grant assignment component 715 may determine that the second grant assigns the second uplink resource for a relay data transmission by a second UE and a second downlink resource for feedback by the base station associated with the relay data transmission.

In some examples, the grant assignment component 715 may determine that the second grant assigns the second uplink resource for a relay data transmission by the second UE and assigns a second downlink resource for feedback by the base station associated with the relay data transmission, where the communicating is based on determining that the second grant assigns the second uplink resource for a relay data transmission by the second UE and assigns a second downlink resource for feedback by the base station associated with the relay data transmission.

In some examples, the grant assignment component 715 may determine that the packet assigns a feedback resource that the second UE is to use for transmitting feedback associated with the source data transmission or for indicating that the second UE is unable to participate in communications according to the second grant, where the communicating is performed based on a transmission by the second UE using the feedback resource.

In some examples, the grant assignment component 715 may determine that the first grant assigns the first uplink resource for a source data transmission by the first UE and a first downlink resource for feedback by the base station associated with the source data transmission, where the communicating is based on determining that the first grant assigns the first uplink resource for a source data transmission by the first UE and a first downlink resource for feedback by the base station associated with the source data transmission.

In some examples, the grant assignment component 715 may determine that the second grant assigns a feedback resource that the second UE is to use for transmitting feedback associated with the source data transmission or for indicating that the second UE is unable to participate in communications according to the second grant, where the communicating is based on determining that the second grant assigns a feedback resource that the second UE is to use for transmitting feedback associated with the source data transmission or for indicating that the second UE is unable to participate in communications according to the second grant.

The communication interface 720 may communicate with one or more of the second UE or the base station based on the first grant for the first UE.

In some examples, the communication interface 720 may communicate with one or more of the first UE or the base station based on the second grant.

In some examples, the communication interface 720 may monitor the first uplink resource for the source data transmission transmitted by the first UE.

The packet interface 725 may receive a packet addressed to the first UE that includes downlink control information indicating the first grant and the second grant, where determining that the first grant assigns the first uplink resource, and the first downlink resource is based on the downlink control information.

In some examples, the packet interface 725 may receive a packet addressed to the first UE that includes downlink control information indicating the first grant and the second grant, where the second UE determines that the second grant assigns the second uplink resource and the second downlink resource based on the downlink control information.

The DCI interface 730 may receive a first downlink control information message that indicates the first grant and a second downlink control information message that indicates the second grant.

In some examples, the DCI interface 730 may receive a first downlink control information message that indicates the first grant and a second downlink control information message that indicates the second grant.

The data transmission component 735 may transmit the source data transmission using the first uplink resource.

In some examples, the data transmission component 735 may transmit a data transmission using the second uplink resource configured by the second grant for the second UE based at least in part. on feedback transmitted by the base station using the first downlink resource, an indication transmitted by the second UE that the second UE is unable to participate in communications according to the second grant, or any combination thereof.

In some examples, the data transmission component 735 may retransmit the source data transmission based on the base station transmitting a negative-acknowledgment message using the first downlink resource.

In some examples, the data transmission component 735 may transmit a new source data transmission based on the base station transmitting an acknowledgement message using the first downlink resource.

In some examples, the data transmission component 735 may retransmit the source data transmission based on the second UE transmitting a negative-acknowledgment message using the first downlink resource.

In some examples, the data transmission component 735 may refrain from transmitting a data transmission using an uplink resource configured by the second grant for the second UE based on feedback transmitted by the base station using the first downlink resource, an indication transmitted by the second UE that the second UE is unable to participate in communications according to the second grant, feedback transmitted by the second UE and associated with the source data transmission, or any combination thereof.

In some examples, the data transmission component 735 may retransmit, to the base station, the source data transmission as the relay data transmission using the second uplink resource based on decoding the source data transmission based on the second grant.

The feedback monitoring component 740 may monitor the first downlink resource for feedback by the base station associated with the source data transmission based on the first grant.

In some examples, the feedback monitoring component 740 may monitor a feedback resource configured by the second grant for feedback associated with the source transmission or for an indication that the second UE is unable to participate in communications according to the second grant transmitted by the second UE.

The feedback component 745 may receive, from the base station using the first downlink resource, feedback associated with the source data transmission, where transmitting the data transmission using the second uplink resource is based on the received feedback.

In some examples, the feedback component 745 may receive, from the second UE using a feedback resource configured by the second grant, feedback associated with the source data transmission, where transmitting the data transmission using the second uplink resource is based on the received feedback.

In some examples, the feedback component 745 may monitor a first downlink resource configured by the first grant for feedback by the base station associated with the source data transmission, where the communicating is performed based on the feedback transmitted by the base station.

In some examples, the feedback component 745 may transmit feedback using a feedback resource indicated by the second grant, where the feedback indicates a result of attempting to decode the source data transmission.

The second UE interface 750 may receive, from the second UE using a feedback resource configured by the second grant, an indication that the second UE is unable to participate in communications according to the second grant, where transmitting the data transmission using the second uplink resource is based on the received indication.

The control interface 755 may receive, from the base station, a control message that includes an indication of whether the first UE is to use a resource configured by the second grant for a data transmission based on feedback transmitted by the base station using the first downlink resource, an indication transmitted by the second UE that the second UE is unable to participate in communications according to the second grant, feedback transmitted by the second UE, or any combination thereof, where the communicating is based on receiving the control message.

In some cases, the control message includes a medium access control layer control element message, a radio resource control message.

In some cases, the indication is included in downlink control information of the one or more transmissions.

The decoding component 760 may refrain from attempting to decode the source data transmission based on the feedback indicating that the base station was able to successfully decode the source data transmission.

In some examples, the decoding component 760 may attempt to decode the source data transmission based on the feedback indicating that the base station was unable to successfully decode the source data transmission.

In some examples, the decoding component 760 may attempt to decode the source data transmission based on the monitoring.

The participation component 765 may transmit, to the base station and the first UE using feedback resources configured by the second grant, an indication that the second UE is unable to participate in communicating according to the second grant.

Figure 8:
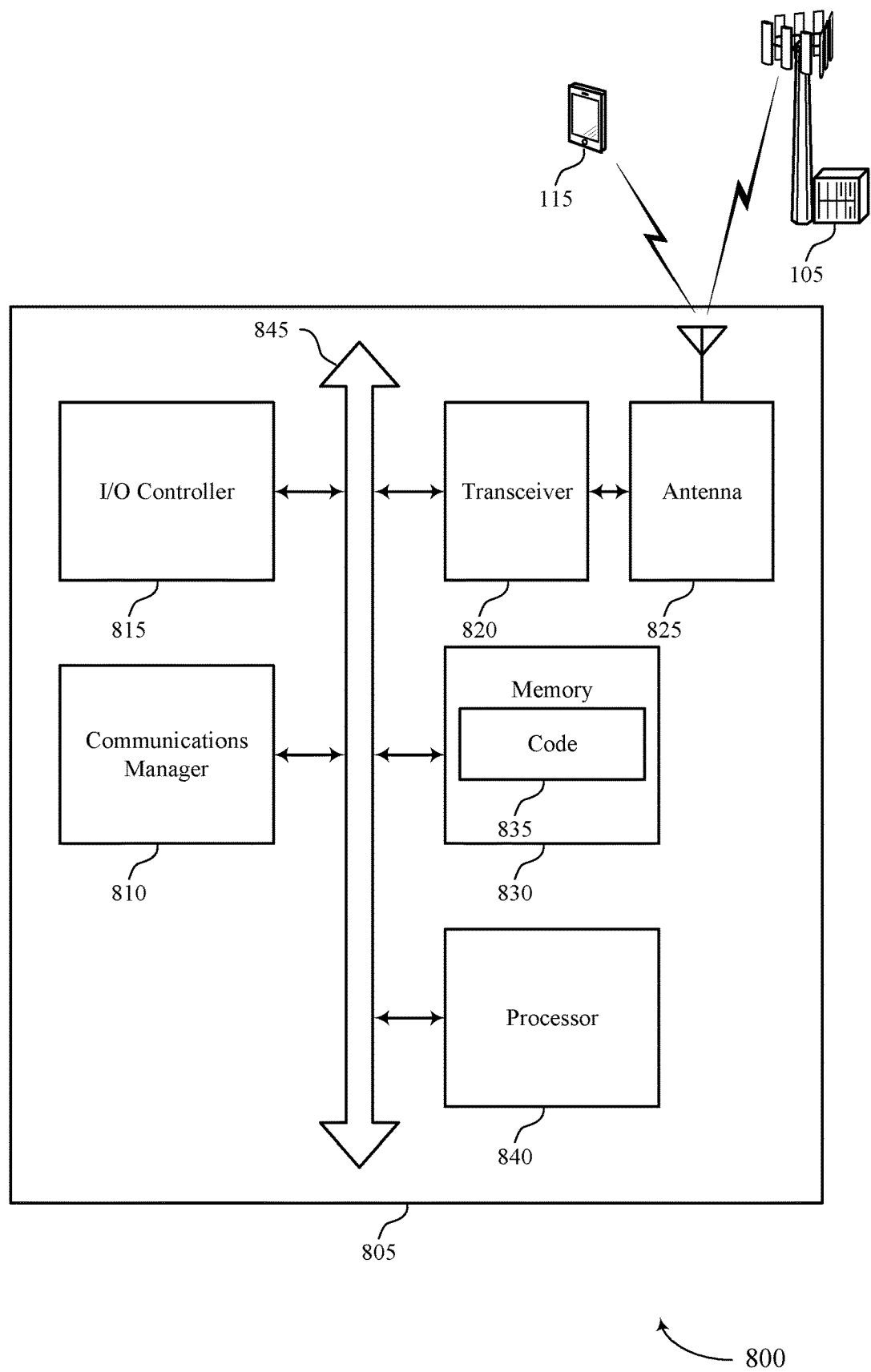
FIG. 8 shows a diagram of a system including a device that supports techniques to support user equipment based relaying for coverage enhancement in accordance with aspects of the present disclosure.

FIG. 8 shows a diagram of a system 800 including a device 805 that supports techniques to support user equipment based relaying for coverage enhancement in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, from a base station, one or more transmissions that include a first grant for the first UE associated with a first uplink resource and a second grant for a second UE associated with a second uplink resource. The communications manager 810 may determine that the first grant assigns the first uplink resource for a source data transmission by the first UE and assigns a first downlink resource for feedback by the base station associated with the source data transmission. The communications manager 810 may communicate with one or more of the second UE or the base station based on the first grant for the first UE. The communications manager 810 may receive, from a base station, one or more transmissions that include a first grant for the first UE associated with a first uplink resource and a second grant for the second UE associated with a second uplink resource. The communications manager 810 may determine that the second grant assigns the second uplink resource for a relay data transmission by a second UE and a second downlink resource for feedback by the base station associated with the relay data transmission. The communications manager 810 may communicate with one or more of the first UE or the base station based on the second grant.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques to support user equipment based relaying for coverage enhancement).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
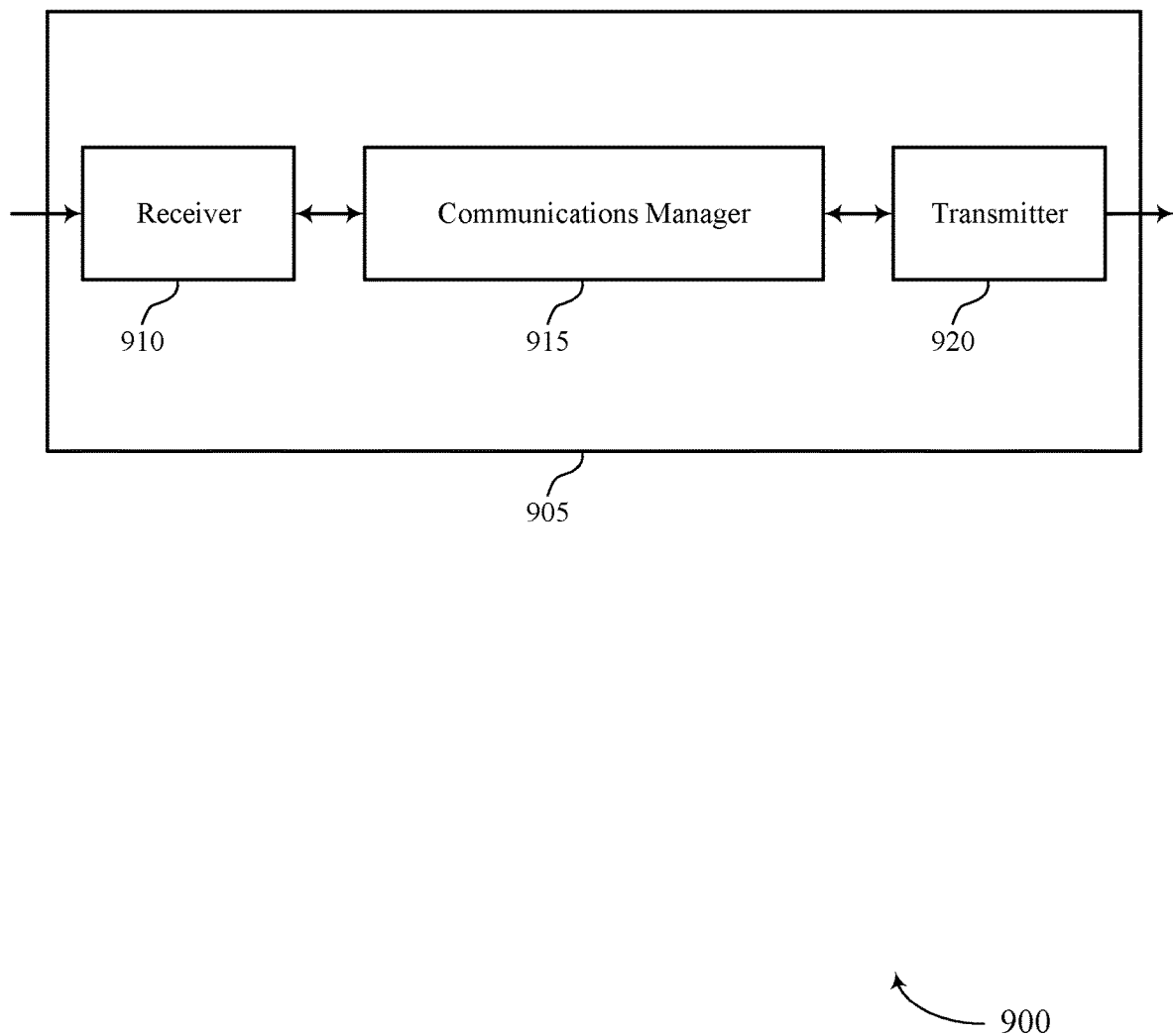
FIGS. 9 and 10 show block diagrams of devices that support techniques to support user equipment based relaying for coverage enhancement with aspects of the present disclosure.

FIG. 9 shows a block diagram 900 of a device 905 that supports techniques to support user equipment based relaying for coverage enhancement in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to techniques to support user equipment based relaying for coverage enhancement, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may generate a first grant that assigns a first uplink resource for a source data transmission by a first UE and assigns a first downlink resource for feedback by the base station associated with the source data transmission. The communications manager 915 may generate a second grant that assigns a second uplink resource for a relay data transmission by a second UE and assigns a second downlink resource for feedback by the base station associated with the relay data transmission. The communications manager 915 may transmit the first grant to the first UE and the second grant to the second UE. The communications manager 915 may communicate with one or more of the first UE or the second UE based on transmitting the packet that includes the first grant and the second grant. The communications manager 915 may be an example of aspects of the communications manager 1210 described herein.

The communications manager 915 may support wireless communications in accordance with examples as disclosed herein. For example, the communications manager 915 may be configured as or otherwise support a means for generating a first grant that assigns a first set of resources for a source data transmission by a first UE. The communications manager 915 may be configured as or otherwise support a means for generating a second grant that assigns a second set of resources for a second UE. The communications manager 915 may be configured as or otherwise support a means for transmitting, to the first UE and the second UE, a transmission that includes the first grant and the second grant. The communications manager 915 may be configured as or otherwise support a means for communicating with one or more of the first UE or the second UE based on transmitting the packet that includes the first grant and the second grant.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
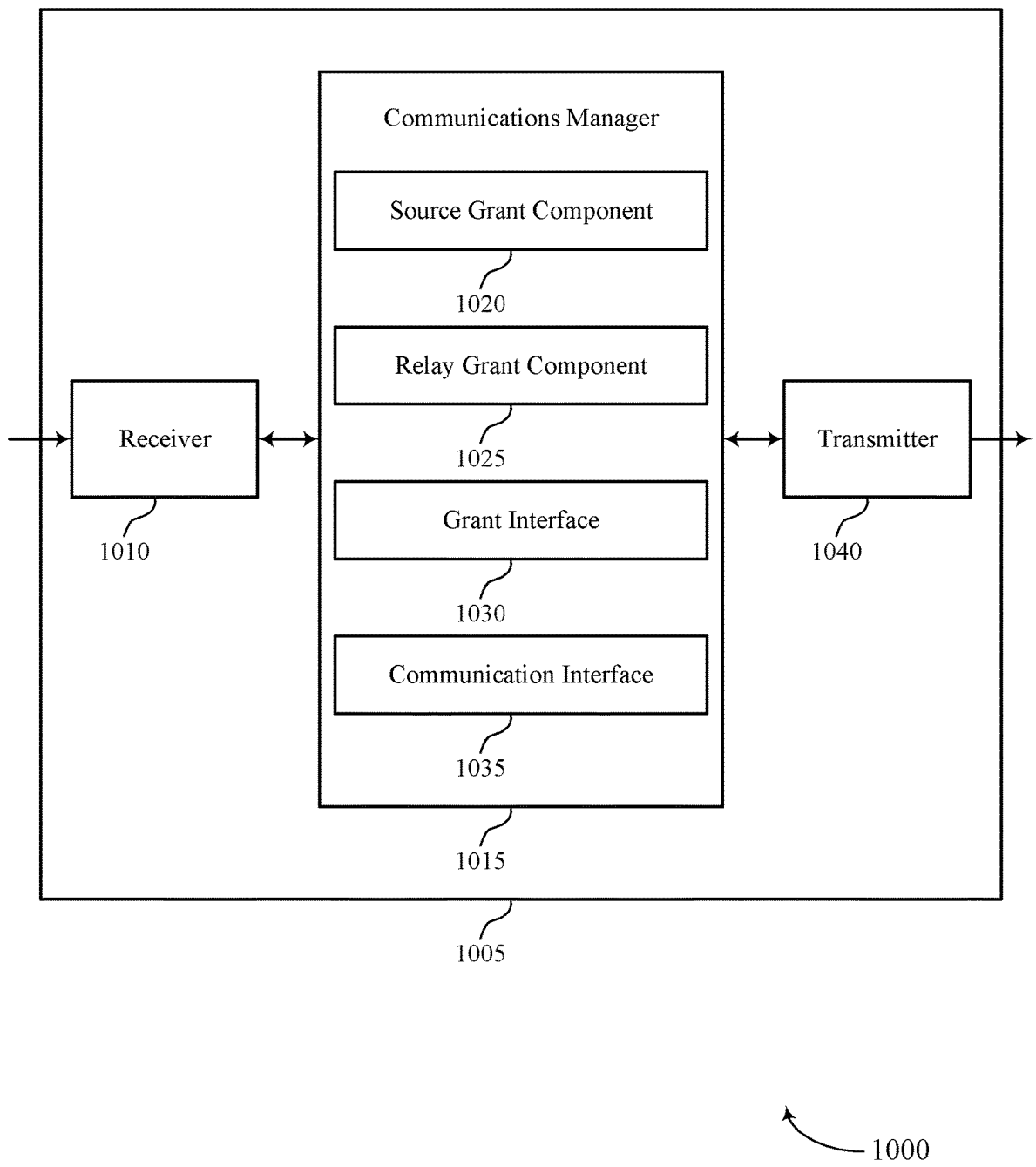

FIG. 10 shows a block diagram 1000 of a device 1005 that supports techniques to support user equipment based relaying for coverage enhancement in accordance with aspects of the present disclosure. The device 1005 may be an example of aspects of a device 905, or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to techniques to support user equipment based relaying for coverage enhancement, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a source grant component 1020, a relay grant component 1025, a grant interface 1030, and a communication interface 1035. The communications manager 1015 may be an example of aspects of the communications manager 1210 described herein.

The source grant component 1020 may generate a first grant that assigns a first uplink resource for a source data transmission by a first UE and assigns a first downlink resource for feedback by the base station associated with the source data transmission.

The relay grant component 1025 may generate a second grant that assigns a second uplink resource for a relay data transmission by a second UE and assigns a second downlink resource for feedback by the base station associated with the relay data transmission.

The grant interface 1030 may transmit the first grant to the first UE and the second grant to the second UE.

The communication interface 1035 may communicate with one or more of the first UE or the second UE based on transmitting the packet that includes the first grant and the second grant.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
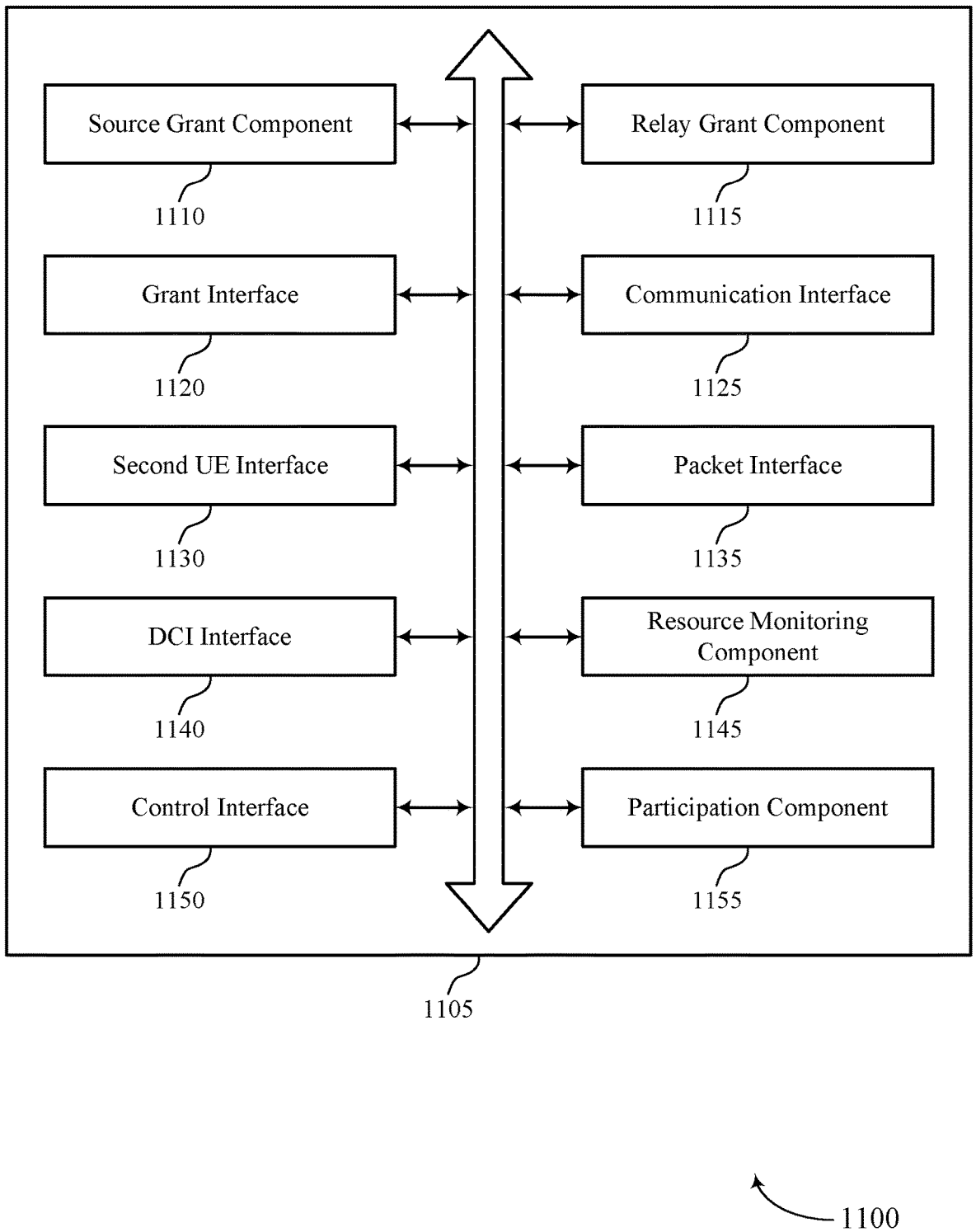
FIG. 11 shows a block diagram of a communications manager that supports techniques to support user equipment based relaying for coverage enhancement in accordance with aspects of the present disclosure.

FIG. 11 shows a block diagram 1100 of a communications manager 1105 that supports techniques to support user equipment based relaying for coverage enhancement in accordance with aspects of the present disclosure. The communications manager 1105 may be an example of aspects of a communications manager 915, a communications manager 1015, or a communications manager 1210 described herein. The communications manager 1105 may include a source grant component 1110, a relay grant component 1115, a grant interface 1120, a communication interface 1125, a second UE interface 1130, a packet interface 1135, a DCI interface 1140, a resource monitoring component 1145, a control interface 1150, and a participation component 1155. Each of these modules may communicate, directly or indirectly, with one another (e.g., via one or more buses). The source grant component 1110 may generate a first grant that assigns a first uplink resource for a source data transmission by a first UE and assigns a first downlink resource for feedback by the base station associated with the source data transmission.

The relay grant component 1115 may generate a second grant that assigns a second uplink resource for a relay data transmission by a second UE and assigns a second downlink resource for feedback by the base station associated with the relay data transmission.

The grant interface 1120 may transmit the first grant to the first UE and the second grant to the second UE.

The communication interface 1125 may communicate with one or more of the first UE or the second UE based on transmitting the packet that includes the first grant and the second grant.

In some cases, the data transmission is a retransmission of the source data transmission based on the transmitted feedback indicating that the base station was unable to decode the source data transmission.

In some cases, the data transmission is a new source data transmission based on the transmitted feedback indicating that the base station was able to decode the source data transmission.

The second UE interface 1130 may generate the second grant that assigns a feedback resource that the second UE is to use for transmitting feedback associated with the source data transmission or for indicating that the second UE is unable to participate in communications according to the second grant, where the communicating is performed based on a transmission by the second UE using the feedback resource.

In some examples, the second UE interface 1130 may receive, from the second UE using feedback resource configured by the second grant, an indication that the second UE is unable to participate in the communicating based on the second grant.

The packet interface 1135 may transmit a packet that is addressed to the first UE and includes downlink control information that indicates the first grant and the second grant.

The DCI interface 1140 may transmit a first downlink control information message that includes the first grant to the first UE.

In some examples, the DCI interface 1140 may transmit a second downlink control information message that includes the second grant to the second UE.

In some examples, the DCI interface 1140 may transmit, to a third UE, a third grant that assigns the second uplink resource to the third UE based on receiving the indication.

The resource monitoring component 1145 may monitor for transmission of the source data transmission by the first UE using the first uplink resources based on the first grant.

In some examples, the resource monitoring component 1145 may transmit feedback associated with the source data transmission using the first downlink resource based on the monitoring based on the first grant.

In some examples, the resource monitoring component 1145 may monitor the second uplink resource for a retransmission of the source data transmission by the second UE based on the transmitted feedback indicating that the base station was unable to decode the source data transmission.

In some examples, the resource monitoring component 1145 may monitor the second uplink resource for a data transmission by the first UE based on the transmitted feedback.

In some examples, the resource monitoring component 1145 may monitor the second uplink resource for a data transmission by the first UE based on receiving the indication.

The control interface 1150 may transmit, to the first UE, a control message that includes an indication of whether the first UE is to use the second uplink resource configured by the second grant for a data transmission based on feedback transmitted by the base station using the first downlink resource, an indication transmitted by the second UE that the second UE is unable to participate in communications according to the second grant, feedback transmitted by the second UE, or any combination thereof.

In some cases, the control message includes a medium access control layer control element message, a radio resource control message. In some cases, the indication is included in downlink control information of the packet.

The participation component 1155 may receive, from the second UE, an indication of that the second UE is unable to participate in the communicating according to the second grant or feedback indicating that the second UE is unable to decode the source data transmission.

Figure 12:
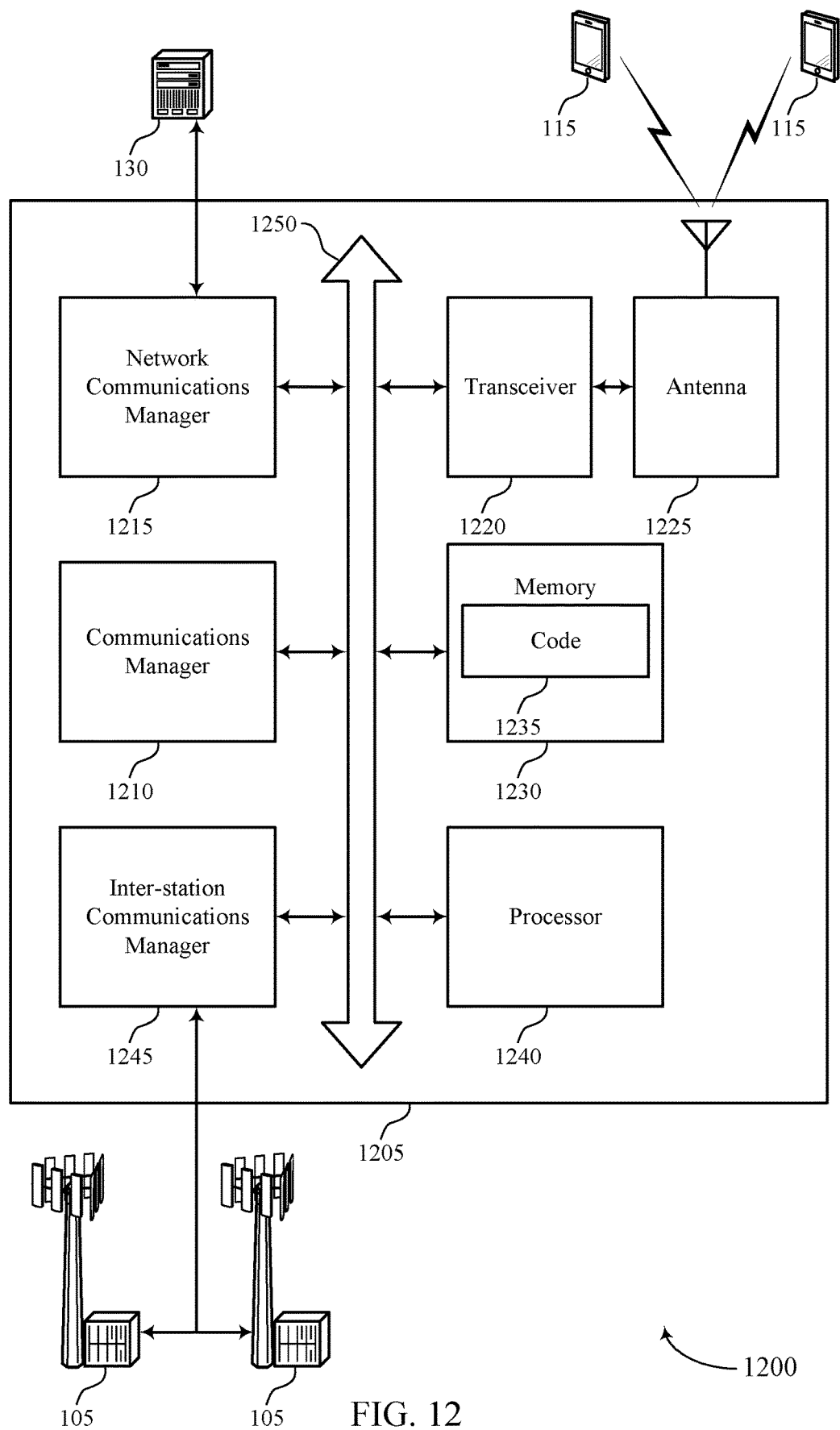
FIG. 12 shows a diagram of a system including a device that supports techniques to support user equipment based relaying for coverage enhancement in accordance with aspects of the present disclosure.

FIG. 12 shows a diagram of a system 1200 including a device 1205 that supports techniques to support user equipment based relaying for coverage enhancement in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may generate a first grant that assigns a first uplink resource for a source data transmission by a first UE and assigns a first downlink resource for feedback by the base station associated with the source data transmission. The communications manager 1210 may generate a second grant that assigns a second uplink resource for a relay data transmission by a second UE and assigns a second downlink resource for feedback by the base station associated with the relay data transmission. The communications manager 1210 may transmit the first grant to the first UE and the second grant to the second UE. The communications manager 1210 may communicate with one or more of the first UE or the second UE based on transmitting the packet that includes the first grant and the second grant.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting techniques to support user equipment based relaying for coverage enhancement).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
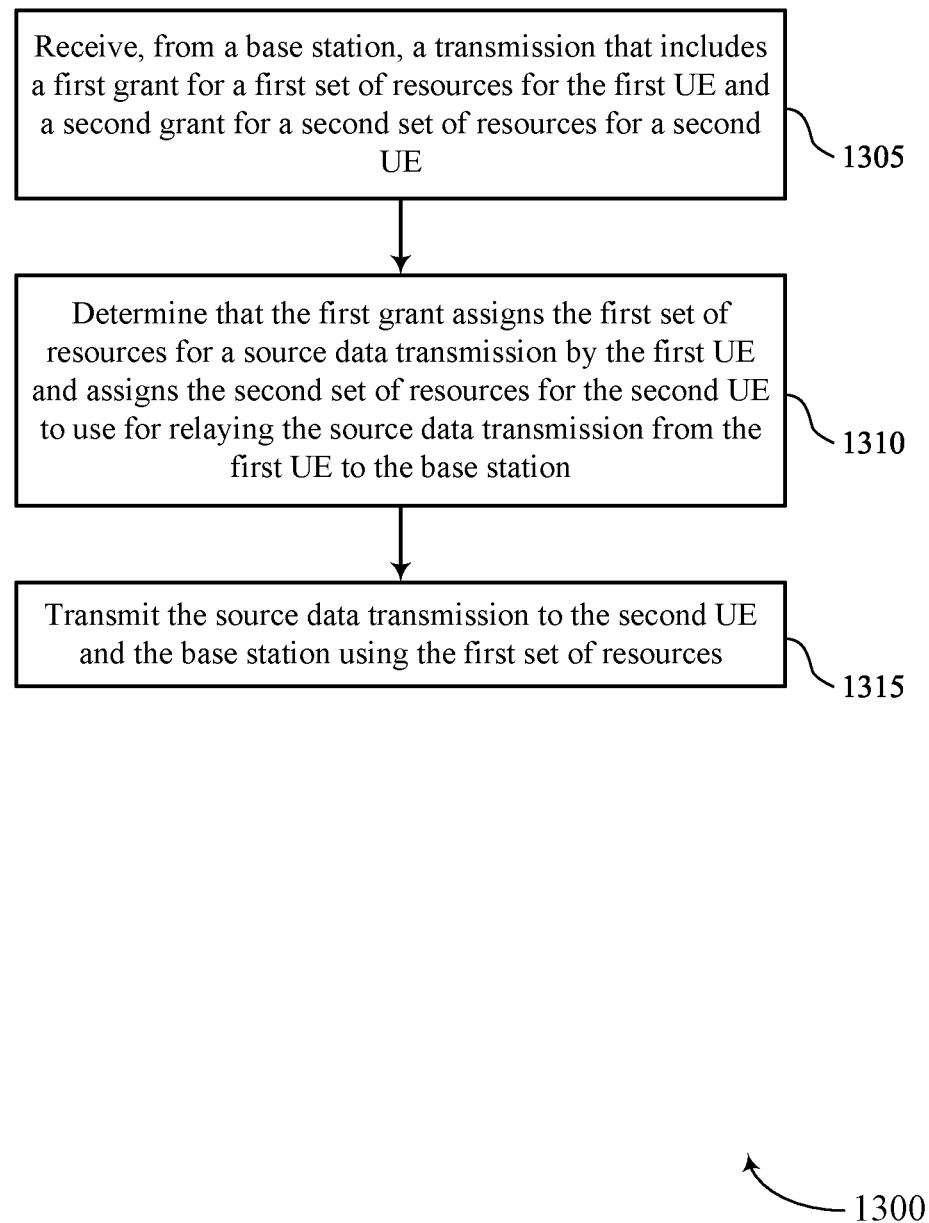
FIGS. 13 through 15 show flowcharts illustrating methods that support techniques to support user equipment based relaying for coverage enhancement in accordance with aspects of the present disclosure.

FIG. 13 shows a flowchart illustrating a method 1300 that supports techniques to support user equipment based relaying for coverage enhancement in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the method may include receiving, from a base station, a transmission that includes a first grant for a first set of resources for the first UE and a second grant for a second set of resources for a second UE. The operations of 1305 may be performed in accordance with examples as disclosed herein. In some examples, aspects of the operations of 1305 may be performed by a grant interface 710 as described with reference to FIG. 7.

At 1310, the method may include determining that the first grant assigns the first set of resources for a source data transmission by the first UE and assigns the second set of resources for the second UE to use for relaying the source data transmission from the first UE to the base station. The operations of 1310 may be performed in accordance with examples as disclosed herein. In some examples, aspects of the operations of 1310 may be performed by a grant assignment component 715 as described with reference to FIG. 7.

At 1315, the method may include transmitting the source data transmission to the second UE and the base station using the first set of resources. The operations of 1315 may be performed in accordance with examples as disclosed herein. In some examples, aspects of the operations of 1315 may be performed by a communication interface 720 as described with reference to FIG. 7.

Figure 14:
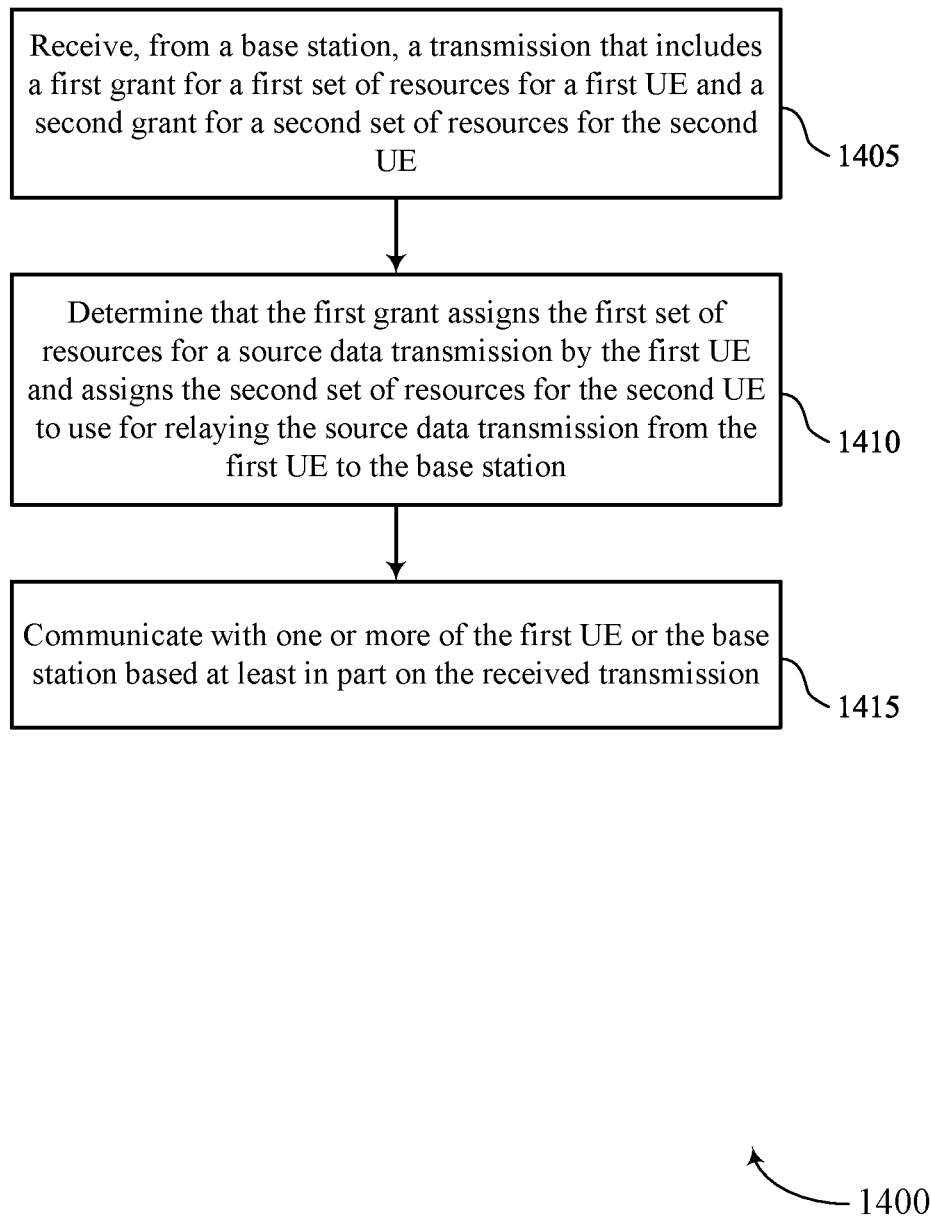

FIG. 14 shows a flowchart illustrating a method 1400 that supports techniques to support user equipment based relaying for coverage enhancement in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the method may include receiving, from a base station, a transmission that includes a first grant for a first set of resources for a first UE and a second grant for a second set of resources for the second UE. The operations of 1405 may be performed in accordance with examples as disclosed herein. In some examples, aspects of the operations of 1405 may be performed by a grant interface 710 as described with reference to FIG. 7.

At 1410, the method may include determining that the first grant assigns the first set of resources for a source data transmission by the first UE and assigns the second set of resources for the second UE to use for relaying the source data transmission from the first UE to the base station. The operations of 1410 may be performed in accordance with examples as disclosed herein. In some examples, aspects of the operations of 1410 may be performed by a grant assignment component 715 as described with reference to FIG. 7.

At 1415, the method may include communicating with one or more of the first UE or the base station based on the received transmission. The operations of 1415 may be performed in accordance with examples as disclosed herein. In some examples, aspects of the operations of 1415 may be performed by a communication interface 720 as described with reference to FIG. 7.

Figure 15:
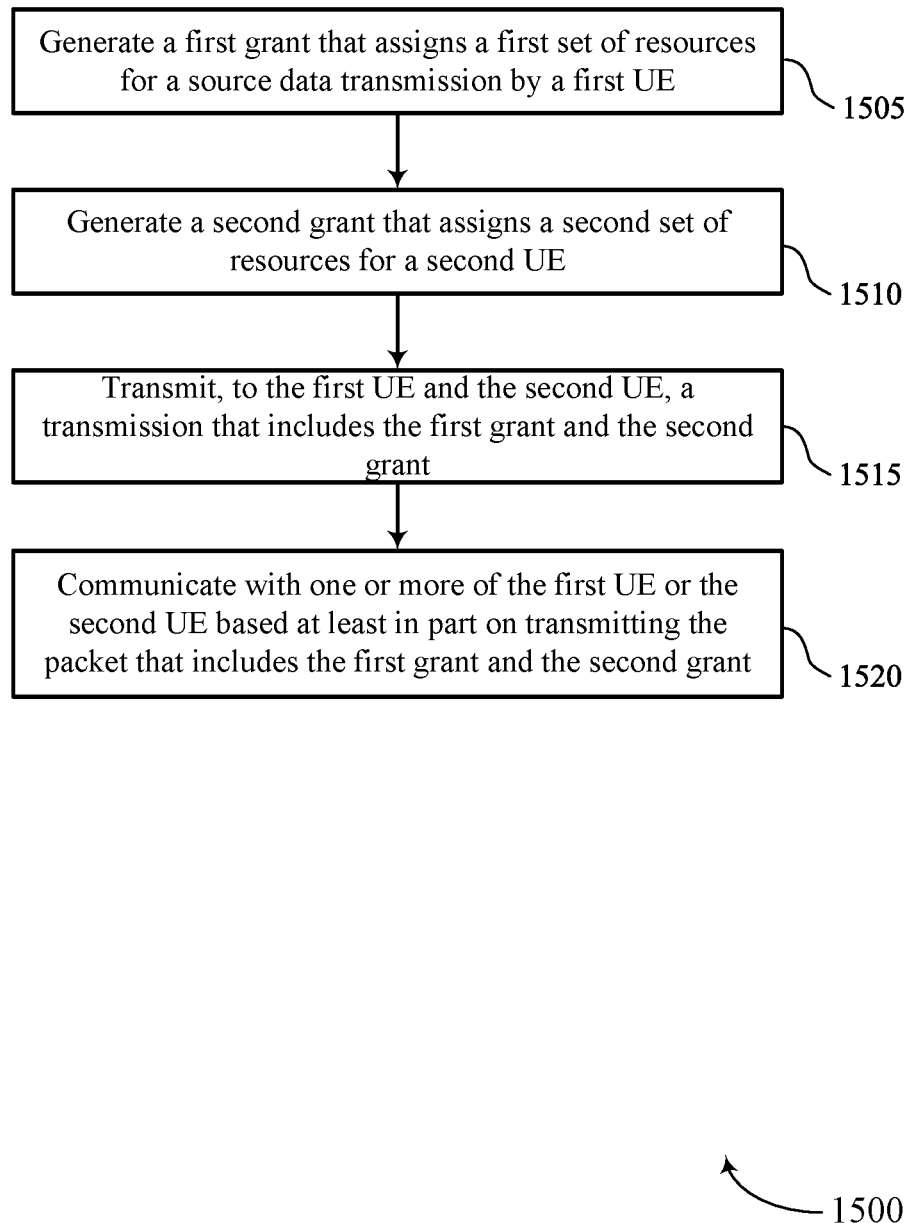

FIG. 15 shows a flowchart illustrating a method 1500 that supports techniques to support user equipment based relaying for coverage enhancement in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1505, the method may include generating a first grant that assigns a first set of resources for a source data transmission by a first UE. The operations of 1505 may be performed in accordance with examples as disclosed herein. In some examples, aspects of the operations of 1505 may be performed by a source grant component 1110 as described with reference to FIG. 11.

At 1510, the method may include generating a second grant that assigns a second set of resources for a second UE. The operations of 1510 may be performed in accordance with examples as disclosed herein. In some examples, aspects of the operations of 1510 may be performed by a relay grant component 1130 as described with reference to FIG. 11.

At 1515, the method may include transmitting, to the first UE and the second UE, a transmission that includes the first grant and the second grant. The operations of 1515 may be performed in accordance with examples as disclosed herein.

In some examples, aspects of the operations of 1515 may be performed by a grant interface 1120 as described with reference to FIG. 11.

At 1520, the method may include communicating with one or more of the first UE or the second UE based on transmitting the packet that includes the first grant and the second grant. The operations of 1520 may be performed in accordance with examples as disclosed herein. In some examples, aspects of the operations of 1520 may be performed by a communication interface 1125 as described with reference to FIG. 11.

Aspect 1: A method for wireless communications at a first UE, comprising: receiving, from a base station, a transmission that includes a first grant for a first set of resources for the first UE and a second grant for a second set of resources for a second UE; determining that the first grant assigns the first set of resources for a source data transmission by the first UE and assigns the second set of resources for the second UE to use for relaying the source data transmission from the first UE to the base station; and transmitting the source data transmission to the second UE and the base station using the first set of resources.

Aspect 2: The method of aspect 1, wherein receiving the transmission comprises: receiving a packet addressed to the first UE that includes downlink control information indicating the first grant and the second grant, wherein determining that the first grant assigns the first set of resources and the second set of resources is based at least in part on the downlink control information.

Aspect 3: The method of any of aspects 1 through 2, wherein receiving the transmission comprises: receiving the first grant for the first set of resources that includes a sidelink resource and an uplink resource, wherein the first UE communicates with the second UE using the sidelink resource and the base station using the uplink resource.

Aspect 4: The method of any of aspects 1 through 3, wherein receiving the transmission comprises: receiving a downlink control information message that assigns a resource that the second UE is to use for transmitting feedback associated with a source data transmission by the first UE or for indicating that the second UE is unable to participate in communications according to the second grant, wherein the communicating is performed based at least in part on a transmission by the second UE using the feedback resource.

Aspect 5: The method of any of aspects 1 through 4, further comprising: receiving, from the second UE using a resource configured by the transmission, an indication that the second UE is unable to participate in communications according to the second grant.

Aspect 6: The method of any of aspects 1 through 5, further comprising: receiving, from the second UE using a resource configured by the transmission, an indication of a duration during which the second UE is unable to participate in relaying communications.

Aspect 7: The method of any of aspects 1 through 4, further comprising: receiving, from the second UE using a resource configured by the transmission, feedback associated with the source data transmission.

Aspect 8: The method of any of aspects 1 through 7, further comprising: receiving, from the second UE using a resource configured by the transmission, channel information that includes an indication of a transmission precoding matrix indicator, an indication of channel state information, or a combination thereof.

Aspect 9: The method of aspect 8, wherein receiving the channel information comprises: receiving the channel information with the indication that the second UE is unable to participate in communications according to the second grant or with feedback associated with the source data transmission.

Aspect 10: The method of any of aspects 8 through 9, wherein receiving the channel information comprises: receiving the channel information in response to receiving the transmission including the second grant.

Aspect 11: The method of any of aspects 1 through 10, further comprising: monitoring a resource configured by the transmission for feedback, by the base station, associated with the source data transmission by the first UE.

Aspect 12: The method of any of aspects 1 through 11, further comprising: receiving, from the base station, a control message that activates feedback for the communications by the first UE using the first set of resources; and monitoring, based at least in part on receiving the control message, a first downlink resource configured by the transmission for feedback by the base station associated with a source data transmission by the first UE.

Aspect 13: The method of any of aspects 1 through 12, further comprising: receiving, from the base station, a downlink control information message that indicates that the UE is to retransmit a source data transmission communicated to the base station via the second UE or via the first UE; and retransmitting the source data transmission based at least in part on the downlink control information message.

Aspect 14: The method of any of aspects 1 through 4 and 7 through 12, further comprising: determining that the second UE retransmits the source data transmission using the second set of resources; and monitoring, based at least in part on determining that the second UE retransmits the source data transmission, for feedback, by the base station, associated with the source data transmission.

Aspect 15: A method for wireless communications at a second UE, comprising: receiving, from a base station, a transmission that includes a first grant for a first set of resources for a first UE and a second grant for a second set of resources for the second UE; determining that the first grant assigns the first set of resources for a source data transmission by the first UE and assigns the second set of resources for the second UE to use for relaying the source data transmission from the first UE to the base station; and communicating with one or more of the first UE or the base station based at least in part on the received transmission.

Aspect 16: The method of aspect 15, wherein receiving the transmission comprising comprises: receiving a packet addressed to the first UE that includes downlink control information indicating the first grant and the second grant, wherein the second UE determines that the second grant assigns the first set of resources and the second set of resources based at least in part on the downlink control information.

Aspect 17: The method of any of aspects 15 through 16, wherein receiving the transmission comprises: receiving the first grant for the second set of resources that includes a sidelink resource and an uplink resource, wherein the second UE receives the source data transmission from the first UE using the sidelink resource, the second UE communicates with the base station using the uplink resource, or both.

Aspect 18: The method of any of aspects 15 through 17, wherein receiving the transmission comprises: receiving a downlink control information message that assigns a resources that the second UE is to use for transmitting feedback associated with a source data transmission by the first UE or for indicating that the second UE is unable to participate in communications according to the second grant, wherein the second UE communicates with the first UE or the base station base station based at least in part on the downlink control information message.

Aspect 19: The method of any of aspects 15 through 18, further comprising: transmitting, using a resource configured by the transmission, an indication that the second UE is unable to participate in communications according to the second grant.

Aspect 20: The method of any of aspects 15 through 19, further comprising: transmitting, using a resource configured by the transmission, an indication of a duration during which the second UE is unable to participate in relaying communications.

Aspect 21: The method of any of aspects 15 through 18, further comprising: receiving, from the first UE using the first set of resources, the source data transmission; and transmitting, using a resource configured by the transmission, feedback associated with the source data transmission.

Aspect 22: The method of any of aspects 15 through 21, further comprising: transmitting, using a resource configured by the transmission, channel information that includes an indication of a transmission precoding matrix indicator, an indication of channel state information, or a combination thereof.

Aspect 23: The method of aspect 22, wherein transmitting the channel information comprises: transmitting the channel information with an indication that the second UE is unable to participate in communications according to the second grant or with feedback associated with the source data transmission.

Aspect 24: The method of any of aspects 22 through 23, wherein transmitting the channel information comprises: transmitting the channel information in response to receiving the transmission including the second grant.

Aspect 25: The method of any of aspects 15 through 24, further comprising: receiving, from the base station via a resource configured by the transmission, feedback associated with the source data transmission by the first UE, wherein the communicating is performed based at least in part on the feedback transmitted by the base station.

Aspect 26: The method of aspect 25, further comprising: refraining from communicating according to the second grant based at least in part on the feedback indicating that the base station was able to successfully decode the source data transmission.

Aspect 27: The method of any of aspects 25 through 26, further comprising: communicating according to the second grant based at least in part on the feedback indicating that the base station was unable to successfully decode the source data transmission.

Aspect 28: The method of any of aspects 15 through 18 and 21 through 27, further comprising: receiving, from the first UE using the first set of resources, the source data transmission; and transmitting, to the base station using the second set of resources, the source data transmission.

Aspect 29: The method of aspect 28, further comprising: monitoring, based at least in part on transmitting the source data transmission, a resource configured by the transmission for feedback, by the base station, associated with the source data transmission transmitted by the second UE.

Aspect 30: A method for wireless communications, at a base station comprising: generating a first grant that assigns a first set of resources for a source data transmission by a first UE; generating a second grant that assigns a second set of resources for a second UE; transmitting, to the first UE and the second UE, a transmission that includes the first grant and the second grant; and communicating with one or more of the first UE or the second UE based at least in part on transmitting the packet that includes the first grant and the second grant Aspect 31: An apparatus for wireless communications at a first UE, comprising a processor; memory coupled with the processor; and instructions stored in the memory and executable by the processor to cause the apparatus to perform a method of any of aspects 1 through 14.

Aspect 32: An apparatus for wireless communications at a first UE, comprising at least one means for performing a method of any of aspects 1 through 14.

Aspect 33: A non-transitory computer-readable medium storing code for wireless communications at a first UE, the code comprising instructions executable by a processor to perform a method of any of aspects 1 through 14.

Aspect 34: An apparatus for wireless communications at a second UE, comprising a processor; memory coupled with the processor; and instructions stored in the memory and executable by the processor to cause the apparatus to perform a method of any of aspects 15 through 29.

Aspect 35: An apparatus for wireless communications at a second UE, comprising at least one means for performing a method of any of aspects 15 through 29.

Aspect 36: A non-transitory computer-readable medium storing code for wireless communications at a second UE, the code comprising instructions executable by a processor to perform a method of any of aspects 15 through 29.

Aspect 37: An apparatus for wireless communications, comprising a processor; memory coupled with the processor; and instructions stored in the memory and executable by the processor to cause the apparatus to perform a method of any of aspects 30 through 30.

Aspect 38: An apparatus for wireless communications, comprising at least one means for performing a method of any of aspects 30 through 30.

Aspect 39: A non-transitory computer-readable medium storing code for wireless communications, the code comprising instructions executable by a processor to perform a method of any of aspects 30 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first user equipment (UE), comprising:

receiving, from a network device, a transmission that includes a first grant for a first set of resources for the first UE and a second grant for a second set of resources for a second UE, wherein receiving the transmission comprises receiving the first grant for the first set of resources that includes a sidelink resource and an uplink resource, wherein the first UE communicates with the second UE using the sidelink resource and the network device using the uplink resource;

determining that the received transmission assigns the first set of resources for a source data transmission by the first UE and assigns the second set of resources for the second UE to use for relaying the source data transmission from the first UE to the network device; and transmitting the source data transmission to the second UE and the network device using the first set of resources.

2. The method of claim 1, wherein receiving the transmission comprises:

receiving a packet addressed to the first UE that includes downlink control information indicating the first grant and the second grant, wherein determining that the first grant assigns the first set of resources and the second set of resources is based at least in part on the downlink control information.

3. A method for wireless communications at a first user equipment (UE), comprising:

receiving, from a network device, a transmission that includes a first grant for a first set of resources for the first UE and a second grant for a second set of resources for a second UE, wherein receiving the transmission comprises:
receiving a downlink control information message that assigns a feedback resource that the second UE is to use for transmitting feedback associated with the source data transmission by the first UE or for indicating that the second UE is unable to participate in communications according to the second grant, wherein the transmitting feedback or indicating is performed based at least in part on a transmission by the second UE using the feedback resource;
determining that the received transmission assigns the first set of resources for a source data transmission by the first UE and assigns the second set of resources for the second UE to use for relaying the source data transmission from the first UE to the network device; and
transmitting the source data transmission to the second UE and the network device using the first set of resources.

4. A method for wireless communications at a first user equipment (UE), comprising:
receiving, from a network device, a transmission that includes a first grant for a first set of resources for the first UE and a second grant for a second set of resources for a second UE;
determining that the received transmission assigns the first set of resources for a source data transmission by the first UE and assigns the second set of resources for the second UE to use for relaying the source data transmission from the first UE to the network device;
transmitting the source data transmission to the second UE and the network device using the first set of resources; and
receiving, from the second UE using a resource configured by the transmission, an indication that the second UE is unable to participate in communications according to the second grant.

5. The method of claim 1, further comprising:
receiving, from the second UE using a resource configured by the transmission, an indication of a duration during which the second UE is unable to participate in relaying communications.

6. The method of claim 1, further comprising:
receiving, from the second UE using a resource configured by the transmission, feedback associated with the source data transmission.

7. The method of claim 1, further comprising:
receiving, from the second UE using a resource configured by the transmission, channel information that includes an indication of a transmission precoding matrix indicator, an indication of channel state information, or a combination thereof.

8. The method of claim 7, wherein receiving the channel information comprises:
receiving the channel information with the indication that the second UE is unable to participate in communications according to the second grant or with feedback associated with the source data transmission.

9. The method of claim 7, wherein receiving the channel information comprises:
receiving the channel information in response to receiving the transmission including the second grant.

10. The method of claim 1, further comprising:
monitoring a resource configured by the transmission for feedback, by the network device, associated with the source data transmission by the first UE.

11. The method of claim 1, further comprising:
receiving, from the network device, a control message that activates feedback for the communications by the first UE using the first set of resources; and
monitoring, based at least in part on receiving the control message, a first downlink resource configured by the transmission for feedback by the network device associated with the source data transmission by the first UE.

12. A method for wireless communications at a first user equipment (UE), comprising:
receiving, from a network device, a transmission that includes a first grant for a first set of resources for the first UE and a second grant for a second set of resources for a second UE;
determining that the received transmission assigns the first set of resources for a source data transmission by the first UE and assigns the second set of resources for the second UE to use for relaying the source data transmission from the first UE to the network device;
transmitting the source data transmission to the second UE and the network device using the first set of resources;
receiving, from the network device, a downlink control information message that indicates that the first UE is to retransmit the source data transmission communicated to the network device via the second UE or via the first UE; and
retransmitting the source data transmission based at least in part on the downlink control information message.

13. The method of claim 1, further comprising:
determining that the second UE retransmits the source data transmission using the second set of resources; and
monitoring, based at least in part on determining that the second UE retransmits the source data transmission, for feedback, by the network device, associated with the source data transmission.

14. A method for wireless communications at a second user equipment (UE), comprising:
receiving, from a network device, a transmission that includes a first grant for a first set of resources for a first UE and a second grant for a second set of resources for the second UE, wherein receiving the transmission comprises receiving the first grant for the second set of resources that includes a sidelink resource and an uplink resource, wherein the second UE receives the source data transmission from the first UE using the sidelink resource, the second UE communicates with the network device using the uplink resource, or both;
determining that the received transmission assigns the first set of resources for a source data transmission by the first UE and assigns the second set of resources for the second UE to use for relaying the source data transmission from the first UE to the network device; and
communicating with one or more of the first UE or the network device based at least in part on the received transmission.

15. The method of claim 14, wherein receiving the transmission comprising comprises:
receiving a packet addressed to the first UE that includes downlink control information indicating the first grant and the second grant, wherein the second UE determines that the second grant assigns the first set of resources and the second set of resources based at least in part on the downlink control information.

16. A method for wireless communications at a second user equipment (UE), comprising:
receiving, from a network device, a transmission that includes a first grant for a first set of resources for a first UE and a second grant for a second set of resources for the second UE, wherein receiving the transmission comprises:
receiving a downlink control information message that assigns a feedback resource that the second UE is to use for transmitting feedback associated with the source data transmission by the first UE or for indicating that the second UE is unable to participate in communications according to the second grant, wherein the second UE communicates with the first UE or the network device based at least in part on the downlink control information message;
determining that the received transmission assigns the first set of resources for a source data transmission by the first UE and assigns the second set of resources for the second UE to use for relaying the source data transmission from the first UE to the network device; and
communicating with one or more of the first UE or the network device based at least in part on the received transmission.

17. A method for wireless communications at a second user equipment (UE), comprising:
receiving, from a network device, a transmission that includes a first grant for a first set of resources for a first UE and a second grant for a second set of resources for the second UE;
determining that the received transmission assigns the first set of resources for a source data transmission by the first UE and assigns the second set of resources for the second UE to use for relaying the source data transmission from the first UE to the network device;
communicating with one or more of the first UE or the network device based at least in part on the received transmission; and
transmitting, using a resource configured by the transmission, an indication that the second UE is unable to participate in communications according to the second grant.

18. The method of claim 14, further comprising:
transmitting, using a resource configured by the transmission, an indication of a duration during which the second UE is unable to participate in relaying communications.

19. The method of claim 14, further comprising:
receiving, from the first UE using the first set of resources, the source data transmission; and
transmitting, using a resource configured by the transmission, feedback associated with the source data transmission.

20. The method of claim 14, further comprising:
transmitting, using a resource configured by the transmission, channel information that includes an indication of a transmission precoding matrix indicator, an indication of channel state information, or a combination thereof.

21. The method of claim 20, wherein transmitting the channel information comprises:
transmitting the channel information with an indication that the second UE is unable to participate in communications according to the second grant or with feedback associated with the source data transmission.

22. The method of claim 20, wherein transmitting the channel information comprises:
transmitting the channel information in response to receiving the transmission including the second grant.

23. The method of claim 14, further comprising:
receiving, from the network device via a resource configured by the transmission, feedback associated with the source data transmission by the first UE, wherein the communicating is performed based at least in part on the feedback transmitted by the network device.

24. The method of claim 23, further comprising:
refraining from communicating according to the second grant based at least in part on the feedback indicating that the network device was able to successfully decode the source data transmission.

25. The method of claim 23, further comprising:
communicating according to the second grant based at least in part on the feedback indicating that the network device was unable to successfully decode the source data transmission.

26. The method of claim 14, further comprising:
receiving, from the first UE using the first set of resources, the source data transmission; and
transmitting, to the network device using the second set of resources, the source data transmission.

27. An apparatus for wireless communications at a first user equipment (UE), comprising:
memory; and
one or more processors coupled with the memory and configured, individually and collectively, to:
receive, from a network device, a transmission that includes a first grant for a first set of resources for the first UE and a second grant for a second set of resources for a second UE, wherein receiving the transmission comprises receiving the first grant for the first set of resources that includes a sidelink resource and an uplink resource, wherein the first UE communicates with the second UE using the sidelink resource and the network device using the uplink resource;
determine that the received transmission assigns the first set of resources for a source data transmission by the first UE and assigns the second set of resources for the second UE to use for relaying the source data transmission from the first UE to the network device; and
transmit the source data transmission to the second UE and the network device using the first set of resources.

28. An apparatus for wireless communications at a second user equipment (UE), comprising:
memory; and
one or more processors coupled with the memory and configured, individually and collectively, to:
receive, from a network device, a transmission that includes a first grant for a first set of resources for a first UE and a second grant for a second set of resources for the second UE, wherein receiving the transmission comprises receiving the first grant for the second set of resources that includes a sidelink resource and an uplink resource, wherein the second UE receives the source data transmission from the first UE using the sidelink resource, the second UE communicates with the network device using the uplink resource, or both;

determine that the received transmission assigns the first set of resources for a source data transmission by the first UE and assigns the second set of resources for the second UE to use for relaying the source data transmission from the first UE to the network device; and communicate with one or more of the first UE or the network device based at least in part on the received transmission.

* * * * *